(12) United States Patent
Bailey et al.

(10) Patent No.: US 11,009,951 B2
(45) Date of Patent: May 18, 2021

(54) WEARABLE MUSCLE INTERFACE SYSTEMS, DEVICES AND METHODS THAT INTERACT WITH CONTENT DISPLAYED ON AN ELECTRONIC DISPLAY

(71) Applicant: Facebook Technologies, LLC, Menlo Park, CA (US)

(72) Inventors: Matthew Bailey, Kitchener (CA); Aaron Grant, Kitchener (CA); Stephen Lake, Kitchener (CA)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/696,760

(22) Filed: Nov. 26, 2019

(65) Prior Publication Data
US 2020/0159325 A1 May 21, 2020

Related U.S. Application Data

(63) Continuation of application No. 14/155,107, filed on Jan. 14, 2014, now Pat. No. 10,528,135.
(Continued)

(51) Int. Cl.
*G06F 3/01* (2006.01)
*G06F 3/0484* (2013.01)
(Continued)

(52) U.S. Cl.
CPC ........... *G06F 3/015* (2013.01); *G02B 27/017* (2013.01); *G06F 3/011* (2013.01); *G06F 3/014* (2013.01);
(Continued)

(58) Field of Classification Search
CPC ........ G06F 3/014; G06F 3/017; G06F 3/0484; G06F 3/011; G06F 3/015; G06F 3/016; G02B 27/017; H04W 4/80
See application file for complete search history.

(56) References Cited

U.S. PATENT DOCUMENTS

| 1,411,995 A | 4/1922 | Dull |
| 3,408,133 A | 10/1968 | Lee |

(Continued)

FOREIGN PATENT DOCUMENTS

| DE | 1 412 278 A1 | 10/1995 |
| EP | 0 301 790 A2 | 2/1989 |

(Continued)

OTHER PUBLICATIONS

Non-Final Office Action received for U.S. Appl. No. 14/155,087 dated Mar. 31, 2015, 22 pages.
(Continued)

*Primary Examiner* — Charles V Hicks
(74) *Attorney, Agent, or Firm* — FisherBroyles, LLP

(57) ABSTRACT

Systems, devices and methods that enable a user to access and interact with content displayed on a portable electronic display in an inconspicuous, hands-free manner are described. There is disclosed a completely wearable system comprising a wearable muscle interface device and a wearable head-mounted display, as well as methods for using the wearable system to effect interactions between the user and content displayed on the wearable head-mounted display. The wearable muscle interface device includes muscle activity sensors worn on an arm of the user to detect muscle activity generated when the user performs a physical gesture. The wearable system is adapted to recognize a plurality of gestures made by the user and, in response to each recognized gesture, to effect one or more interaction(s) with content displayed on the wearable head-mounted display.

20 Claims, 8 Drawing Sheets

Related U.S. Application Data

(60) Provisional application No. 61/752,226, filed on Jan. 14, 2013.

(51) Int. Cl.
  *G02B 27/01* (2006.01)
  *H04W 4/80* (2018.01)

(52) U.S. Cl.
  CPC ............. *G06F 3/016* (2013.01); *G06F 3/017* (2013.01); *G06F 3/0484* (2013.01); *H04W 4/80* (2018.02)

(56) References Cited

U.S. PATENT DOCUMENTS

| | | | |
|---|---|---|---|
| 3,620,208 A | 11/1971 | Higley et al. |
| 3,712,716 A | 1/1973 | Cornsweet et al. |
| 3,880,146 A | 4/1975 | Everett et al. |
| 4,602,639 A | 7/1986 | Hoogendoorn et al. |
| 4,705,408 A | 11/1987 | Jordi |
| 4,817,064 A | 3/1989 | Milles |
| 4,978,213 A | 12/1990 | El Hage |
| 5,003,978 A | 4/1991 | Dunseath, Jr. |
| D322,227 S | 12/1991 | Warhol |
| 5,081,852 A | 1/1992 | Cox |
| 5,103,323 A | 4/1992 | Magarinos et al. |
| 5,231,674 A | 7/1993 | Cleveland et al. |
| 5,251,189 A | 10/1993 | Thorp |
| D348,660 S | 7/1994 | Parsons |
| 5,445,869 A | 8/1995 | Ishikawa et al. |
| 5,467,104 A | 11/1995 | Furness, III et al. |
| 5,482,051 A | 1/1996 | Reddy et al. |
| 5,589,956 A | 12/1996 | Morishima et al. |
| 5,596,339 A | 1/1997 | Furness, III et al. |
| 5,605,059 A | 2/1997 | Woodward |
| 5,683,404 A | 11/1997 | Johnson |
| 5,742,421 A | 4/1998 | Wells et al. |
| 6,008,781 A | 12/1999 | Furness, III et al. |
| 6,027,216 A | 2/2000 | Guyton et al. |
| 6,032,530 A | 3/2000 | Hock |
| D422,617 S | 4/2000 | Simioni |
| 6,184,847 B1 | 2/2001 | Fateh et al. |
| 6,236,476 B1 | 5/2001 | Son et al. |
| 6,238,338 B1 | 5/2001 | DeLuca et al. |
| 6,244,873 B1 | 6/2001 | Hill et al. |
| 6,317,103 B1 | 11/2001 | Furness, III et al. |
| 6,377,277 B1 | 4/2002 | Yamamoto |
| D459,352 S | 7/2002 | Giovanniello |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,639,570 B2 | 10/2003 | Furness, III et al. |
| 6,720,984 B1 | 4/2004 | Jorgensen et al. |
| 6,743,982 B2 | 6/2004 | Biegelsen et al. |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,450,107 B2 | 11/2008 | Radley-Smith |
| 7,473,888 B2 | 1/2009 | Wine |
| 7,491,892 B2 | 2/2009 | Wagner et al. |
| 7,517,725 B2 | 4/2009 | Reis |
| 7,558,622 B2 | 7/2009 | Tran |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,684,105 B2 | 3/2010 | Lamontagne et al. |
| 7,747,113 B2 | 6/2010 | Mukawa et al. |
| 7,773,111 B2 | 8/2010 | Cleveland et al. |
| 7,809,435 B1 | 10/2010 | Ettare et al. |
| 7,844,310 B2 | 11/2010 | Anderson |
| D628,616 S | 12/2010 | Yuan |
| 7,850,306 B2 | 12/2010 | Uusitalo et al. |
| 7,870,211 B2 | 1/2011 | Pascal et al. |
| D633,939 S | 3/2011 | Puentes et al. |
| D634,771 S | 3/2011 | Fuchs |
| 7,925,100 B2 | 4/2011 | Howell et al. |
| 7,948,763 B2 | 5/2011 | Chuang |
| D640,314 S | 6/2011 | Yang |
| D643,428 S | 8/2011 | Janky et al. |
| D646,192 S | 10/2011 | Woode |
| D649,177 S | 11/2011 | Cho et al. |
| 8,054,061 B2 | 11/2011 | Prance et al. |
| D654,622 S | 2/2012 | Hsu |
| 8,120,828 B2 | 2/2012 | Schwerdtner |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| D667,482 S | 9/2012 | Healy et al. |
| D669,522 S | 10/2012 | Klinar et al. |
| D669,523 S | 10/2012 | Wakata et al. |
| D671,590 S | 11/2012 | Klinar et al. |
| 8,355,671 B2 | 1/2013 | Kramer et al. |
| 8,389,862 B2 | 3/2013 | Arora et al. |
| 8,427,977 B2 | 4/2013 | Workman et al. |
| D682,343 S | 5/2013 | Waters |
| D682,727 S | 5/2013 | Bulgari |
| 8,447,704 B2 | 5/2013 | Tan et al. |
| D685,019 S | 6/2013 | Li |
| 8,467,270 B2 | 6/2013 | Gossweiler, III et al. |
| 8,469,741 B2 | 6/2013 | Oster et al. |
| D687,087 S | 7/2013 | Iurilli |
| D689,862 S | 9/2013 | Liu |
| D692,941 S | 11/2013 | Klinar et al. |
| 8,591,411 B2 | 11/2013 | Banet et al. |
| D695,333 S | 12/2013 | Farnam et al. |
| D695,454 S | 12/2013 | Moore |
| 8,620,361 B2 | 12/2013 | Bailey et al. |
| 8,624,124 B2 | 1/2014 | Koo et al. |
| 8,634,119 B2 | 1/2014 | Bablumyan et al. |
| D701,555 S | 3/2014 | Markovitz et al. |
| 8,666,212 B1 | 3/2014 | Amirparviz |
| 8,702,629 B2 | 4/2014 | Giuffrida et al. |
| 8,704,882 B2 | 4/2014 | Turner |
| D704,248 S | 5/2014 | Dichiara |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,883,287 B2 | 11/2014 | Boyce et al. |
| 8,895,865 B2 | 11/2014 | Lenahan et al. |
| D719,568 S | 12/2014 | Heinrich et al. |
| D719,570 S | 12/2014 | Heinrich et al. |
| 8,912,094 B2 | 12/2014 | Koo et al. |
| 8,922,481 B1 | 12/2014 | Kauffmann et al. |
| D723,093 S | 2/2015 | Li |
| 8,954,135 B2 | 2/2015 | Yuen et al. |
| D724,647 S | 3/2015 | Rohrbach |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,086,687 B2 | 7/2015 | Park et al. |

(56) References Cited

U.S. PATENT DOCUMENTS

| | | | |
|---|---|---|---|
| D736,664 S | 8/2015 | Paradise et al. |
| D738,373 S | 9/2015 | Davies et al. |
| 9,135,708 B2 | 9/2015 | Ebisawa |
| 9,146,730 B2 | 9/2015 | Lazar |
| D741,855 S | 10/2015 | Park et al. |
| D742,272 S | 11/2015 | Bailey et al. |
| D742,874 S | 11/2015 | Cheng et al. |
| D743,963 S | 11/2015 | Osterhout |
| 9,211,417 B2 | 12/2015 | Heldman et al. |
| D747,714 S | 1/2016 | Erbeus |
| D747,759 S | 1/2016 | Ho |
| D750,623 S | 3/2016 | Park et al. |
| D751,065 S | 3/2016 | Magi |
| D756,359 S | 5/2016 | Bailey et al. |
| D758,476 S | 6/2016 | Ho |
| D760,313 S | 6/2016 | Ho et al. |
| 9,367,139 B2 | 6/2016 | Ataee et al. |
| 9,372,535 B2 | 6/2016 | Bailey et al. |
| 9,393,418 B2 | 7/2016 | Giuffrida et al. |
| 9,418,927 B2 | 8/2016 | Axisa et al. |
| D766,895 S | 9/2016 | Choi |
| 9,439,566 B2 | 9/2016 | Arne et al. |
| D768,627 S | 10/2016 | Rochat et al. |
| 9,472,956 B2 | 10/2016 | Michaelis et al. |
| 9,477,313 B2 | 10/2016 | Mistry et al. |
| D771,735 S | 11/2016 | Lee et al. |
| 9,529,434 B2 | 12/2016 | Choi et al. |
| D780,828 S | 3/2017 | Bonaventura et al. |
| D780,829 S | 3/2017 | Bonaventura et al. |
| 10,528,135 B2 | 1/2020 | Bailey et al. |
| 2001/0033402 A1 | 10/2001 | Popovich |
| 2002/0003627 A1 | 1/2002 | Rieder |
| 2002/0030636 A1 | 3/2002 | Richards |
| 2002/0032386 A1 | 3/2002 | Sackner et al. |
| 2002/0077534 A1 | 6/2002 | DuRousseau |
| 2002/0120916 A1 | 8/2002 | Snider, Jr. |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2004/0073104 A1 | 4/2004 | Brun del Re et al. |
| 2004/0194500 A1 | 10/2004 | Rapport |
| 2004/0210165 A1 | 10/2004 | Marmaropoulos et al. |
| 2005/0005637 A1 | 1/2005 | Rapport |
| 2005/0012715 A1* | 1/2005 | Ford .............. G06F 3/015 345/158 |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2006/0132705 A1 | 6/2006 | Li |
| 2006/0238707 A1 | 10/2006 | Elvesjo et al. |
| 2007/0078308 A1 | 4/2007 | Daly |
| 2008/0136775 A1 | 6/2008 | Conant |
| 2009/0007597 A1 | 1/2009 | Hanevold |
| 2009/0031757 A1 | 2/2009 | Harding |
| 2009/0040016 A1 | 2/2009 | Ikeda |
| 2009/0051544 A1 | 2/2009 | Niknejad |
| 2009/0102580 A1 | 4/2009 | Uchaykin |
| 2009/0109241 A1 | 4/2009 | Tsujimoto |
| 2009/0147004 A1 | 6/2009 | Ramon et al. |
| 2009/0179824 A1 | 7/2009 | Tsujimoto et al. |
| 2009/0189867 A1 | 7/2009 | Krah et al. |
| 2009/0207464 A1 | 8/2009 | Wiltshire et al. |
| 2009/0251407 A1 | 10/2009 | Flake et al. |
| 2009/0318785 A1 | 12/2009 | Ishikawa et al. |
| 2009/0322653 A1 | 12/2009 | Putilin et al. |
| 2009/0327171 A1 | 12/2009 | Tan et al. |
| 2010/0041974 A1 | 2/2010 | Ting et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0280628 A1 | 11/2010 | Sankai |
| 2010/0293115 A1 | 11/2010 | Seyed Momen |
| 2010/0317958 A1 | 12/2010 | Beck et al. |
| 2011/0018754 A1 | 1/2011 | Tojima et al. |
| 2011/0072510 A1 | 3/2011 | Cheswick |
| 2011/0134026 A1 | 6/2011 | kang et al. |
| 2011/0166434 A1 | 7/2011 | Gargiulo |
| 2011/0172503 A1 | 7/2011 | Knepper et al. |
| 2011/0181527 A1 | 7/2011 | Capela et al. |
| 2011/0213278 A1 | 9/2011 | Horak et al. |
| 2011/0224556 A1 | 9/2011 | Moon et al. |
| 2011/0224564 A1 | 9/2011 | Moon et al. |
| 2012/0002256 A1 | 1/2012 | Lacoste et al. |
| 2012/0029322 A1 | 2/2012 | Wartena et al. |
| 2012/0051005 A1 | 3/2012 | Vanfleteren et al. |
| 2012/0053439 A1 | 3/2012 | Ylostalo et al. |
| 2012/0101357 A1 | 4/2012 | Hoskuldsson et al. |
| 2012/0139817 A1 | 6/2012 | Freeman |
| 2012/0157789 A1 | 6/2012 | Kangas et al. |
| 2012/0165695 A1 | 6/2012 | Kidmose et al. |
| 2012/0182309 A1 | 7/2012 | Griffin et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0249797 A1 | 10/2012 | Haddick |
| 2012/0265090 A1 | 10/2012 | Fink et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0005303 A1 | 1/2013 | Song et al. |
| 2013/0016292 A1 | 1/2013 | Miao et al. |
| 2013/0016413 A1 | 1/2013 | Saeedi et al. |
| 2013/0020948 A1 | 1/2013 | Han et al. |
| 2013/0027341 A1 | 1/2013 | Mastandrea |
| 2013/0080794 A1 | 3/2013 | Hsieh |
| 2013/0123666 A1 | 5/2013 | Giuffrida et al. |
| 2013/0127708 A1 | 5/2013 | Jung et al. |
| 2013/0135722 A1 | 5/2013 | Yokoyama |
| 2013/0165813 A1 | 6/2013 | Chang et al. |
| 2013/0191741 A1 | 7/2013 | Dickinson et al. |
| 2013/0198694 A1* | 8/2013 | Rahman .............. A61B 5/6824 715/864 |
| 2013/0215235 A1 | 8/2013 | Russell |
| 2013/0222384 A1 | 8/2013 | Futterer |
| 2013/0265229 A1 | 10/2013 | Forutanpour et al. |
| 2013/0265437 A1* | 10/2013 | Thorn .............. H04M 1/72527 348/164 |
| 2013/0271292 A1 | 10/2013 | McDermott |
| 2013/0285901 A1 | 10/2013 | Lee et al. |
| 2013/0293580 A1 | 11/2013 | Spivack |
| 2013/0312256 A1 | 11/2013 | Wesselmann et al. |
| 2013/0317648 A1 | 11/2013 | Assad |
| 2013/0332196 A1 | 12/2013 | Pinkser |
| 2013/0335302 A1 | 12/2013 | Crane et al. |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0094675 A1 | 4/2014 | Luna et al. |
| 2014/0121471 A1 | 5/2014 | Walker |
| 2014/0122958 A1 | 5/2014 | Greeneberg et al. |
| 2014/0194062 A1 | 7/2014 | Palin et al. |
| 2014/0198034 A1 | 7/2014 | Bailey et al. |
| 2014/0202643 A1 | 7/2014 | Hikmet et al. |
| 2014/0204455 A1 | 7/2014 | Popovich et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0249397 A1 | 9/2014 | Lake et al. |
| 2014/0257141 A1 | 9/2014 | Giuffrida et al. |
| 2014/0285326 A1 | 9/2014 | Luna et al. |
| 2014/0285429 A1 | 9/2014 | Simmons |
| 2014/0299362 A1 | 10/2014 | Park et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0349257 A1 | 11/2014 | Connor |
| 2014/0354528 A1 | 12/2014 | Laughlin et al. |
| 2014/0354529 A1 | 12/2014 | Laughlin et al. |

(56) References Cited

U.S. PATENT DOCUMENTS

| | | |
|---|---|---|
| 2014/0364703 A1 | 12/2014 | Kim et al. |
| 2014/0368896 A1 | 12/2014 | Nakazono et al. |
| 2014/0375465 A1 | 12/2014 | Fenuccio et al. |
| 2015/0011857 A1 | 1/2015 | Henson et al. |
| 2015/0025355 A1 | 1/2015 | Bailey et al. |
| 2015/0036221 A1 | 2/2015 | Stephenson |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0084860 A1 | 3/2015 | Aleem et al. |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0141784 A1 | 5/2015 | Morun et al. |
| 2015/0148641 A1 | 5/2015 | Morun et al. |
| 2015/0160621 A1 | 6/2015 | Yilmaz |
| 2015/0182113 A1 | 7/2015 | Utter, II |
| 2015/0182130 A1 | 7/2015 | Utter, II |
| 2015/0182163 A1 | 7/2015 | Utter |
| 2015/0182164 A1 | 7/2015 | Utter, II |
| 2015/0185838 A1 | 7/2015 | Camacho-Perez et al. |
| 2015/0186609 A1 | 7/2015 | Utter, II |
| 2015/0205126 A1 | 7/2015 | Schowengerdt |
| 2015/0205134 A1 | 7/2015 | Bailey et al. |
| 2015/0216475 A1 | 8/2015 | Luna et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0261306 A1 | 9/2015 | Lake |
| 2015/0277575 A1 | 10/2015 | Ataee et al. |
| 2015/0296553 A1 | 10/2015 | DiFranco et al. |
| 2015/0325202 A1 | 11/2015 | Lake et al. |
| 2015/0362734 A1 | 12/2015 | Moser et al. |
| 2015/0370333 A1 | 12/2015 | Ataee et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2016/0020500 A1 | 1/2016 | Matsuda |
| 2016/0033771 A1 | 2/2016 | Tremblay et al. |
| 2016/0150636 A1 | 5/2016 | Otsubo |
| 2016/0156762 A1 | 6/2016 | Bailey et al. |
| 2016/0199699 A1 | 7/2016 | Klassen |
| 2016/0202081 A1 | 7/2016 | Debieuvre et al. |
| 2016/0238845 A1 | 8/2016 | Alexander et al. |
| 2016/0274365 A1 | 9/2016 | Bailey et al. |
| 2016/0274758 A1 | 9/2016 | Bailey |
| 2016/0309249 A1 | 10/2016 | Wu et al. |
| 2016/0313899 A1 | 10/2016 | Noel |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2016/0377866 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |

FOREIGN PATENT DOCUMENTS

| | | |
|---|---|---|
| JP | S61-198892 A | 9/1986 |
| JP | 2009-050679 A | 3/2009 |
| JP | 2013-160905 A | 8/2013 |
| KR | 10-2012-0094870 A | 8/2012 |
| KR | 10-2012-0097997 A | 9/2012 |
| WO | 2011/070554 A2 | 6/2011 |
| WO | 2014/155288 A2 | 10/2014 |
| WO | 2015/123775 A | 8/2015 |

OTHER PUBLICATIONS

Final Office Action received for U.S. Appl. No. 14/155,087 dated Jul. 20, 2015, 27 pages.

Non-Final Office Action received for U.S. Appl. No. 14/155,087 dated Feb. 17, 2016, 26 pages.

Final Office Action received for U.S. Appl. No. 14/155,087 dated Jul. 8, 2016, 27 pages.

Non-Final Office Action received for U.S. Appl. No. 14/155,087 dated Aug. 16, 2016, 28 pages.

Final Office Action received for U.S. Appl. No. 14/155,087 dated Dec. 16, 2016, 32 pages.

Non-Final Office Action received for U.S. Appl. No. 14/155,087 dated Aug. 7, 2017, 28 pages.

Final Office Action received for U.S. Appl. No. 14/155,087 dated Nov. 27, 2017, 40 pages.

Non-Final Office Action received for U.S. Appl. No. 14/155,107 dated Mar. 31, 2015, 26 pages.

Final Office Action received for U.S. Appl. No. 14/155,107 dated Jul. 16, 2015, 28 pages.

Non-Final Office Action received for U.S. Appl. No. 14/155,107 dated Feb. 11, 2016, 42 pages.

Final Office Action received for U.S. Appl. No. 14/155,107 dated Jul. 8, 2016, 31 pages.

Non-Final Office Action received for U.S. Appl. No. 14/155,107 dated Aug. 17, 2016, 37 pages.

Final Office Action received for U.S. Appl. No. 14/155,107 dated Dec. 19, 2016, 35 pages.

Non-Final Office Action received for U.S. Appl. No. 14/155,107 dated Aug. 7, 2017, 34 pages.

Final Office Action received for U.S. Appl. No. 14/155,107 dated Nov. 27, 2017, 44 pages.

Non-Final Office Action received for U.S. Appl. No. 14/155,107 dated Jul. 13, 2018, 45 pages.

Final Office Action received for U.S. Appl. No. 14/155,107 dated Jan. 17, 2019, 46 pages.

Notice of Allowance received for U.S. Appl. No. 14/155,107 dated Aug. 30, 2019, 16 pages.

Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.

Costanza et al., "EMG as a Subtle Input Interface for Mobile Computing," Mobile HCI 2004, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller," CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities," IEEE Transactions on Information Technology in Biomedicine, vol. 14, No. 2, pp. 198-206, Mar. 2010.

International Search Report and Written Opinion, dated May 16, 2014, for corresponding International Application No. PCT/US2014/017799, 11 pages.

Lake et al., "Method and Apparatus for Analyzing Capacitive EMG and IMU Sensor Signals for Gesture Control," U.S. Appl. No. 14/186,878, filed Feb. 21, 2014, 29 pages.

Lake et al.' "Method and Apparatus for Analyzing Capacitive EMG and IMU Sensor Signals for Gesture Control," Preliminary Amendment filed May 9, 2014, for U.S. Appl. No. 14/186,878, 9 pages.

Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.

(56) References Cited

OTHER PUBLICATIONS

Morris et al., "Emerging Input Technologies for Always-Available Mobile Interaction," Foundations and Trends in Human-Computer Interaction 4(4):245-316, 2011. (74 total pages).

Naik et al., "Real-Time Hand Gesture Identification for Human Computer Interaction Based on ICA of Surface Electromyogram," IADIS International Conference Interfaces and Human Computer Interaction 2007, 8 pages.

Picard et al., "Affective Wearables," Proceedings of the IEEE 1.sup.st International Symposium on Wearable Computers, ISWC, Cambridge, MA, USA, Oct. 13-14, 1997, pp. 90-97.

Rekimoto, "GestureWrist and GesturePad: Unobtrusive Wearable Interaction Devices," ISWC '01 Proceedings of the 5.sup.th IEEE International Symposium on Wearable Computers, 2001, 7 pages.

Saponas et al., "Making Muscle-Computer Interfaces More Practical," CHI 2010, Atlanta, Georgia, USA, Apr. 10-15, 2010, 4 pages.

Xiong et al., "A Novel HCI based on EMG and IMU," Proceedings of the 2011 IEEE International Conference on Robotics and Biomimetics, Phuket, Thailand, Dec. 7-11, 2011, 5 pages.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.

Bailey et al., "Muscle Interface Device and Method for Interacting With Content Displayed on Wearable Head Mounted Displays," Office Action dated Mar. 31, 2015, for U.S. Appl. No. 14/155,087, 15 pages.

Bailey et al., "Muscle Interface Device and Method for Interacting With Content Displayed on Wearable Head Mounted Displays," Office Action dated Jul. 20, 2015, for U.S. Appl. No. 14/155,087, 14 pages.

Lake et al., "Method and Apparatus for Analyzing Capacitive EMG and IMU Sensor Signals for Gesture Control," Office Action dated Jun. 17, 2015, for U.S. Appl. No. 14/186,878, 13 pages.

Lake et al., "Method and Apparatus for Analyzing Capacitive EMG and IMU Sensor Signals for Gesture Control," Amendment filed Aug. 21, 2015, for U.S. Appl. No. 14/186,878, 13 pages.

Bailey et al., "Muscle Interface Device and Method for Interacting With Content Displayed on Wearable Head Mounted Displays," Amendment filed Aug. 25, 2015, for U.S. Appl. No. 14/155,087, 10 pages.

Bailey et al., "Muscle Interface Device and Method for Interacting With Content Displayed on Wearable Head Mounted Displays," Office Action dated Feb. 17, 2016, for U.S. Appl. No. 14/155,087, 16 pages.

Lake et al., "Methods and Devices for Combining Muscle Activity Sensor Signals and Inertial Sensor Signals for Gesture-Based Control," Office Action dated Nov. 5, 2015, for U.S. Appl. No. 14/186,889, 11 pages.

Lake et al., "Methods and Devices for Combining Muscle Activity Sensor Signals and Inertial Sensor Signals for Gesture-Based Control," Amendment filed Jan. 8, 2016, for U.S. Appl. No. 14/186,889, 16 pages.

Lake et al., "Methods and Devices for Combining Muscle Activity Sensor Signals and Inertial Sensor Signals for Gesture-Based Control," Office Action dated Jun. 16, 2016, for U.S. Appl. No. 14/186,889, 13 pages.

Lake et al., "Methods and Devices for Combining Muscle Activity Sensor Signals and Inertial Sensor Signals for Gesture-Based Control," Amendment filed Jul. 13, 2016, for U.S. Appl. No. 14/186,889, 12 pages.

Bailey et al., "Muscle Interface Device and Method for Interacting With Content Displayed on Wearable Head Mounted Displays," Amendment filed May 17, 2016, for U.S. Appl. No. 14/155,087, 13 pages.

Bailey et al., "Muscle Interface Device and Method for Interacting With Content Displayed on Wearable Head Mounted Displays," Office Action dated Jul. 8, 2016, for U.S. Appl. No. 14/155,087, 16 pages.

Bailey et al., "Muscle Interface Device and Method for Interacting With Content Displayed on Wearable Head Mounted Displays," Amendment filed Aug. 9, 2016, for U.S. Appl. No. 14/155,087, 8 pages.

Amitai, "P-27: A Two-Dimensional Aperture Expander for Ultra-Compact, High-Performance Head-Worn Displays," SID Symposium Digest of Technical Papers 36(1):360-363, 2005.

Ayras et al., "Exit pupil expander with a large field of view based on diffractive optics," Journal of the SID 17 (8):659-664, 2009.

Chellappan et al., "Laser-based displays: a review," Applied Optics 49(25):F79-F98, 2010.

Cui et al., "Diffraction from angular multiplexing slanted volume hologram gratings," Optik 116:118-122, 2005.

Curatu et al., "Dual Purpose Lens for an Eye-Tracked Projection Head-Mounted Display," International Optical Design Conference 2006, SPIE-OSA 6342:63420X-1-63420X-7, 2007.

Curatu et al., "Projection-based head-mounted display with eye-tracking capabilities," Proc. of SPIE 5875:58750J-1-58750J-9, 2005.

Essex, "Tutorial on Optomechanical Beam Steering Mechanisms," OPTI 521 Tutorial, College of Optical Sciences, University of Arizona, 8 pages, 2006.

Fernandez et al., "Optimization of a thick polyvinyl alcohol-acrylamide photopolymer for data storage using a combination of angular and peristrophic holographic multiplexing," Applied Optics 45(29):7661-7666, 2009.

Gourmelon et al., "Contactless sensors for Surface Electromyography," Proceedings of the 28th IEEE EMBS Annual International Conference, New York City, NY, Aug. 30-Sep. 3, 2006, pp. 2514-2517.

Hainich et al., "Chapter 10: Near-Eye Displays," Displays: Fundamentals & Applications, AK Peters/CRC Press, 2011, 65 pages.

Hornstein et al., "Maradin's Micro-Mirror—System Level Synchronization Notes," SID 2012 Digest, pp. 981-984.

International Search Report, dated Jun. 8, 2016, for PCT/US2016/018293, 17 pages.

International Search Report, dated Jun. 8, 2016, for PCT/US2016/018298, 14 pages.

International Search Report, dated Jun. 8, 2016, for PCT/US2016/018299, 12 pages.

International Search Report and Written Opinion, dated Aug. 21, 2014, for corresponding International Application No. PCT/US2014/037863, 10 pages.

International Search Report and Written Opinion, dated Nov. 21, 2014, for corresponding International Application No. PCT/US2014/052143, 9 pages.

International Search Report and Written Opinion, dated Feb. 27, 2015, for corresponding International Application No. PCT/US2014/067443, 10 pages.

International Search Report and Written Opinion, dated May 27, 2015, for corresponding International Application No. PCT/US2015/015675, 9 pages.

Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

Kessler, "Optics of Near to Eye Displays (NEDs)," Presentation—Oasis 2013, Tel Aviv, Feb. 19, 2013, 37 pages.

Kress et al., "A review of head-mounted displays (HMD) technologies and applications for consumer electronics," Proc. of SPIE 8720:87200A-1-87200A-13, 2013.

Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

Kress, "Optical architectures for see-through wearable displays," Presentation—Bay Area—SID Seminar, Apr. 30, 2014, 156 pages.

Levola, "7.1: Invited Paper: Novel Diffractive Optical Components for Near to Eye Displays," SID Symposium Digest of Technical Papers 37(1):64-67, 2006.

Liao et al., "The Evolution of MEMS Displays," IEEE Transactions on Industrial Electronics 56(4):1057-1065, 2009.

Lippert, "Chapter 6: Display Devices: RSD.TM. (Retinal Scanning Display)," The Avionics Handbook, CRC Press, 2001, 8 pages.

(56) References Cited

OTHER PUBLICATIONS

Majaranta et al., "Chapter 3—Eye-Tracking and Eye-Based Human-Computer Interaction," in Advances in Physiological Computing, Springer-Verlag London, 2014, pp. 17-39.

Sato et al., "Touche. Enhancing Touch Interaction on Humans, Screens, Liquids, and Everyday Objects," CHI' 12, May 5-10, 2012, Austin, Texas.

Schowengerdt et al., "Stereoscopic retinal scanning laser display with integrated focus cues for ocular accommodation" Proc. of SPIE-IS&T Electronic Imaging 5291:366-376, 2004.

Silverman et al., "58.5L: Late-News Paper: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Ueno et al., "A Capacitive Sensor System for Measuring Laplacian Electromyogram through Cloth: A Pilot Study," Proceedings of the 29.sup.th Annual International Conference of the IEEE EMBS, Cite Internationale, Lyon, France, Aug. 23-26, 2007.

Ueno et al., "Feasibility of Capacitive Sensing of Surface Electromyographic Potential through Cloth," Sensors and Materials 24(6):335-346, 2012.

Urey et al., "Optical performance requirements for MEMS-scanner based microdisplays," Conf. on MOEMS and Miniaturized Systems, SPIE 4178:176-185, 2000.

Urey, "Diffractive exit-pupil expander for display applications," Applied Optics 40(32):5840-5851, 2001.

Viirre et al., "The Virtual Retinal Display: A New Technology for Virtual Reality and Augmented Vision in Medicine," Proc. of Medicine Meets Virtual Reality, IOS Press and Ohmsha, 1998, pp. 252-257. (6 pages).

Xu et al., "Hand Gesture Recognition and Virtual Game Control Based on 3D Accelerometer and EMG Sensors," Proceedings of the 14th international conference on Intelligent user interfaces, Sanibel Island, Florida, Feb. 8-11, 2009, pp. 401-406.

Communication pursuant to Rule 164(1) EPC, dated Sep. 30, 2016, for corresponding EP Application No. 14753949.8, 7 pages.

Brownlee, "Finite State Machines (FSM): Finite state machines as a control technique in Artificial Intelligence (AI)," Jun. 2002, 12 pages.

International Search Report and Written Opinion dated Apr. 25, 2017 for corresponding International Application No. PCT/US2016/067246, 12 pages.

Janssen, "What is Radio Frequency (RF)?" Technopedia, 2013, retrieved from https://web.archive.org/web/20130726153946/https://www.technopedia.com/de-finition/5083/radio-frequency-rf, retrieved on Jul. 12, 2017, 2 pages.

Merriam-Webster, "Radio Frequencies," 2017, retrieved from https://www.merriam-webster.com/table/collegiate/radiofre.htm, retrieved on Jul. 12, 2017, 2 pages.

Bailey et al., "Wearable Muscle Interface Systems, Devices and Methods That Interact With Content Displayed on an Electronic Display," Amendment filed May 11, 2016, for U.S. Appl. No. 14/155,107, 15 pages.

Bailey et al., "Wearable Muscle Interface Systems, Devices and Methods That Interact With. Content Displayed on an Electronic Display," Amendment filed Aug. 9, 2016, for U.S. Appl No. 14/155,107, 8 pages.

\* cited by examiner

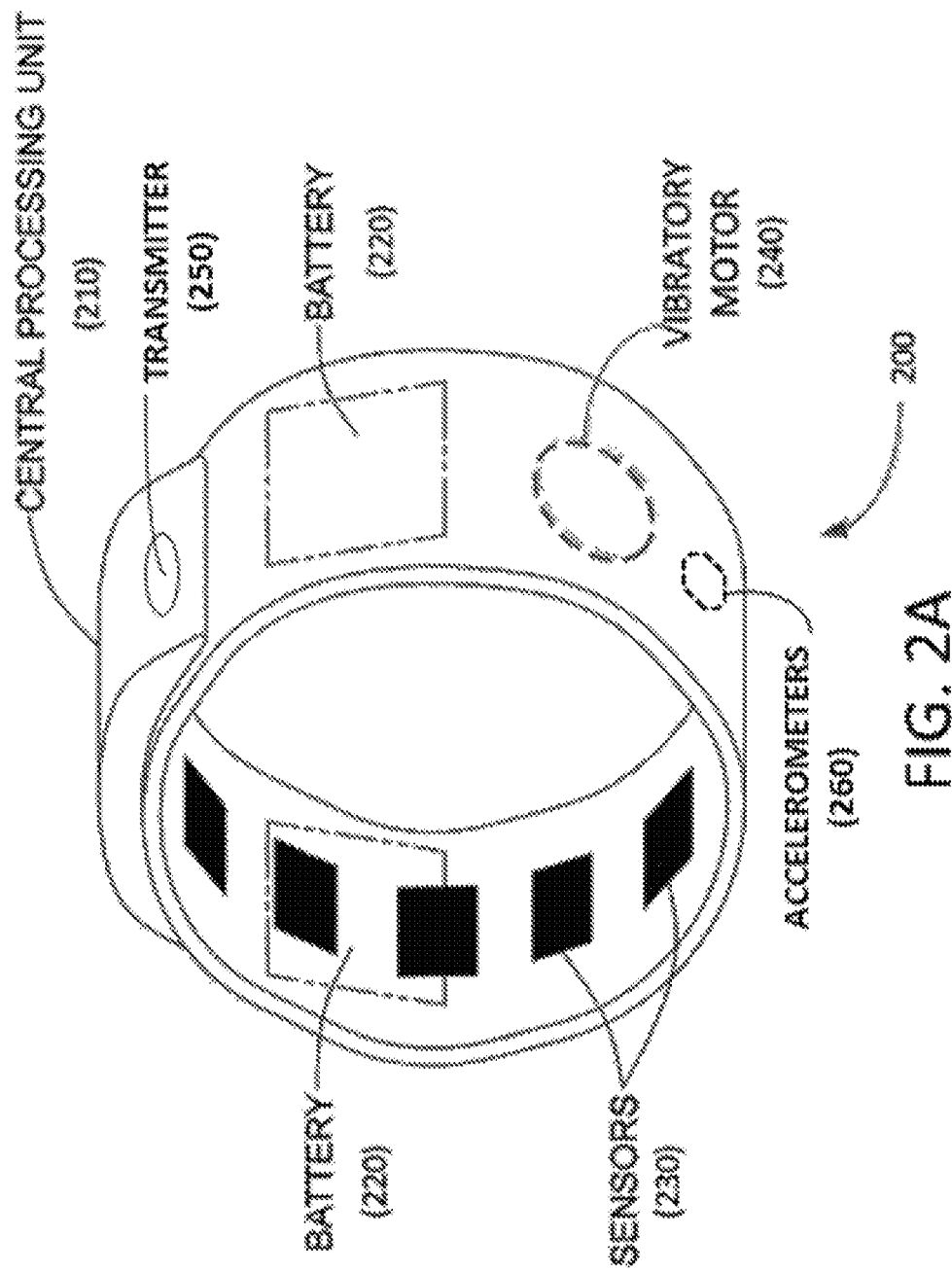

WEARABLE MUSCLE INTERFACE SYSTEMS, DEVICES AND METHODS THAT INTERACT WITH CONTENT DISPLAYED ON AN ELECTRONIC DISPLAY

BACKGROUND

Technical Field

The present systems, devices, and methods relate generally to wearable muscle interfaces, and more specifically to a wearable muscle interface that interacts with content displayed on a wearable head-mounted display.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without a physical wire-connection to any stationary (i.e., non-portable) electronic system (except, in some cases, during charging).

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hand(s). For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic displays, hearing aids, and so on.

Human-Electronics Interfaces

A wearable electronic device may provide direct functionality for a user (such as audio playback, data display, measurement and monitoring, computing functions, "virtual reality," "augmented reality," etc.) or it may provide electronics to interact with, communicate with, or control another electronic device. For example, a wearable electronic device may include sensors that detect inputs affected by a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface.

Electromyography Devices

Electromyography ("EMG") is a process for detecting and processing the electrical signals generated by muscle activity. EMG devices employ EMG sensors that are responsive to the range of electrical potentials (typically μV-mV) involved in muscle activity. EMG signals may be used in a wide variety of applications, including: medical monitoring and diagnosis, muscle rehabilitation, exercise and training, prosthetic control, and even in controlling functions of electronic devices.

Human-electronics interfaces that employ EMG have been proposed. For example, U.S. Pat. Nos. 6,244,873 and 8,170,656 both describe proposals in which a user dons a wearable EMG device and performs physical gestures to control functions of a separate electronic device. In both cases, the separate electronic device is not itself a wearable electronic device, so true hands-free operation of and/or access to the separate electronic device is not achieved. For example, both cases describe using EMG signals to control mobile phones, smart phones, computers, laptop computers, and so on, all of which still typically require the user to use their hand(s) to carry the device and/or to orient the device in such a way that the user may see, access, receive feedback from, and/or generally interact with a display screen on the device.

Interacting with Head-Mounted Displays

As described above, portable electronic devices that include display screens typically require the user to use their hand(s) to carry the device and/or to orient the device so that the user may see, access, receive feedback from, and/or generally interact with the device's display screen. Occupying the user's hand(s) is an inconvenience that can significantly hinder the user's ability to interact with the portable electronic device and/or to interact with other aspects of their environment while operating the portable electronic device. However, this hindrance is at least partially overcome by making the display screen of the portable electronic device wearable. Making the display screen of the portable electronic device wearable enables the user to see, access, and/or receive feedback from the display screen without using their hand(s). In recent years, wearable head-mounted displays have begun to gain wider acceptance, with a number of recently introduced wearable head-mounted display devices having the potential for widespread adoption by consumers.

One such device disclosed in U.S. Pat. No. 8,203,502 issued to Chi et al. utilizes a finger operable input device such as a touch pad built into the wearable head-mounted display (e.g. built into a side-arm of a pair of glasses, with one of the lenses functioning as a display screen) such that a user can interact with and control content appearing on the display screen with positioning and movement of a finger along a surface of the input device. A potential drawback of this approach is that a user is required to conspicuously raise his or her hand to touch the input device each time the user wants to interact with content displayed on the screen. Furthermore, even though the display itself is wearable, it is still controlled by touch and so is not actually hands-free (thus negating part of the benefit of making the display wearable in the first place).

Another such device is disclosed in US 2012/0293548 (Perez et al.) in which a head-mounted display provides users with supplemental information on a display screen provided in at least one of the lenses of a pair of glasses. A processing unit may be connected to the head-mounted display to provide the computing power necessary for its operation. However, the method of user interaction with the display is not specified.

Yet another example of such a device is disclosed in U.S. Pat. No. 8,212,859 issued to Tang et al. in which a source image is projected onto screens built into head-mounted displays worn by a user. Tang et al. focuses on the method and system for projection, and does not specify the manner of user interaction with the head-mounted display device.

U.S. Pat. No. 5,482,051 ('051 patent) describes a human-electronics interface in which a user's EMG signals are detected and used to interact with content that is ultimately displayed on a head-mounted visual display unit. However, the interface described in the '051 patent is not a portable system. The human-electronics interface described in the '051 patent consists of at least three disparate components that are communicatively coupled in series with one another; i) a set of EMG sensors, ii) a stand-alone processing system, and iii) a head-mounted visual display unit. Although the set of EMG sensors and the head-mounted visual display unit are both physically coupled to (i.e., worn by) the user, there is no direct communication between the set of EMG sensors and the head-mounted visual display unit. Detected EMG signals are sent from the set of EMG sensors to the stand-alone processing system (i.e., off the body of the user) where they are processed to achieve some effect, and then signals that represent the effect are sent from the processing system to the head-mounted visual display unit where the effect is displayed to the user. The stand-alone processing system mediates all communication between the set of EMG sensors and the head-mounted visual display unit. The processing system is not worn by the user and is not portable (i.e., it is stationary), and therefore the human-electronics interface described in the '051 patent is limited in that the user must be in close proximity to the stationary processing system in order to use the interface.

What is needed is a completely wearable (i.e., completely portable) user interface that enables a user to see, access and interact with an electronic display in an inconspicuous, hands-free manner.

BRIEF SUMMARY

The present disclosure relates to a muscle interface device and method for interacting with content displayed on wearable head mounted displays.

More generally, the muscle interface device comprises a sensor worn on the forearm of a user, and the sensor is adapted to recognize a plurality of gestures made by a user's hand and or wrist to interact with content displayed on the wearable head mounted display.

In an embodiment, the muscle interface device utilizes a plurality of electromyographic (EMG) sensors to detect electrical activity produced by muscles during contraction, and convert the electrical signals for processing. The electrical signals detected from the muscles are interpreted as gestures (e.g. a combination of hand, wrist and arm movements) made by a user which provide a control input to a wearable head mounted display. The control input is preferably provided wirelessly via a wireless communication protocol, such as Near-Field Communication ("NFC") or Bluetooth™, for example.

In another embodiment, various types of sensors may be used alone or in lieu of or in combination with EMG sensors to detect gestures made by a user, for processing as a control input for interacting with a wearable head mounted display. This may be one or more mechanomyographic (MMG) sensors to detect vibrations made by muscles during contraction, or one or more accelerometer sensors to detect larger movements.

In another embodiment, the muscle interface device includes a calibration module with a routine for calibrating the muscle interface device for use with the wearable head mounted display.

Other features and advantages will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

A wearable muscle interface device that in use interacts with content displayed on a wearable head-mounted display may be summarized as including: a plurality of muscle activity sensors to be worn on an arm of a user, the muscle activity sensors responsive to signals generated by muscles in the arm of the user; and a transmitter communicatively coupled to the plurality of muscle activity sensors, wherein in use the transmitter transmits at least one signal from the wearable muscle interface device directly to a receiver on the wearable head-mounted display based on the signals detected by the muscle activity sensors; wherein the at least one signal transmitted, in use, from the wearable muscle interface device directly to the receiver on the wearable head-mounted display effects at least one interaction with content displayed on the wearable head-mounted display. The wearable muscle interface device may further include a processor that in use interprets the signals detected by the muscle activity sensors as a gesture, wherein the processor is communicatively coupled in between the transmitter and the plurality of muscle activity sensors, and wherein the at least one signal that, in use, is transmitted from the wearable muscle interface device may be based on the gesture interpreted by the processor of the wearable muscle interface device. The wearable head-mounted display may include a processor communicatively coupled to the receiver of the wearable head-mounted display, and the at least one signal that, in use, is transmitted from the wearable muscle interface device to the wearable head-mounted display may be interpreted as a gesture by the processor of the wearable head-mounted display.

The wearable muscle interface device may further include a haptic feedback module that in use provides haptic feedback to the user, the haptic feedback module including a vibratory motor. The plurality of muscle activity sensors may include at least one muscle activity sensor selected from the group consisting of: an electromyographic (EMG) sensor and a mechanomyographic (MMG) sensor. The wearable muscle interface device may further include at least one accelerometer that in use detects signals generated by motion of the arm of the user, the at least one accelerometer communicatively coupled to the transmitter, and wherein in use the at least one signal transmitted from the transmitter of the wearable muscle interface device directly to the receiver on the wearable head-mounted display may be based on both the signals detected by the muscle activity sensors and the signals detected by the at least one accelerometer. The transmitter may include a wireless transmitter.

A wearable system that in use provides hands-free access to and control of a portable electronic display may be summarized as including: i) a wearable muscle interface device comprising: a plurality of muscle activity sensors to be worn on an arm of a user, the muscle activity sensors responsive to signals generated by muscles in the arm of the user; and a transmitter communicatively coupled to the plurality of muscle activity sensors, wherein in use the transmitter transmits at least one signal from the wearable muscle interface device based on the signals detected by the muscle activity sensors; and ii) a wearable head-mounted display comprising: at least one display screen to be worn on a head of the user, the at least one display screen arranged to be positioned in front of at least one eye of the user when worn on the head of the user; a receiver communicatively coupled to the at least one display screen, wherein in use the receiver directly receives the at least one signal transmitted from the transmitter of the wearable muscle interface device; and a processor communicatively coupled to the receiver and to the at least one display screen, wherein in use the at least one signal received directly from the transmitter of the wearable muscle interface device by the receiver of the wearable head-mounted display effects control of at least one function of the wearable head-mounted display. The transmitter of the wearable muscle interface device may include a wireless transmitter and the receiver of the wearable head-mounted display may include a wireless receiver. The wearable muscle interface device of the wearable system may further include a processor that in use interprets the signals detected by the muscle activity sensors as a gesture, wherein the processor of the wearable muscle interface device is communicatively coupled in between the transmitter and the plurality of muscle activity sensors, and wherein the at least one signal that, in use, is transmitted from the wearable muscle interface device may be based on the gesture interpreted by the processor of the wearable muscle interface device.

The plurality of muscle activity sensors in the wearable muscle interface device of the wearable system may include at least one muscle activity sensor selected from the group consisting of: an electromyographic (EMG) sensor and a mechanomyographic (MMG) sensor. The wearable muscle interface device of the wearable system may further include at least one accelerometer that in use detects signals generated by motion of the arm of the user, the at least one accelerometer communicatively coupled to the transmitter, and wherein in use the at least one signal transmitted by the transmitter of the wearable muscle interface device may be based on both the signals detected by the muscle activity sensors and the signals detected by the at least one accelerometer.

A method of using a wearable system to achieve hands-free access to and control of a portable electronic display, wherein the wearable system includes a wearable muscle interface device and a wearable head-mounted display, may be summarized as including: detecting muscle activity corresponding to a physical gesture performed by a user of the wearable system by at least one muscle activity sensor of the wearable muscle interface device; transmitting at least one signal from the wearable muscle interface device by a transmitter of the wearable muscle interface device based at least in part on the muscle activity detected by at least one muscle activity sensor of the wearable muscle interface device; receiving the at least one signal directly from the wearable muscle interface device by a receiver of the wearable head-mounted display; processing the at least one signal by a processor of the wearable head-mounted display; and effecting at least one interaction between the user and the wearable head-mounted display by the processor of the wearable head-mounted display based on the processing of the at least one signal by the processor of the wearable head-mounted display. The method may further include, in response to detecting muscle activity corresponding to a physical gesture performed by a user of the wearable system by at least one muscle activity sensor of the wearable muscle interface device, processing the detected muscle activity by a processor of the wearable muscle interface device, and transmitting at least one signal from the wearable muscle interface device by a transmitter of the wearable muscle interface device based at least in part on the muscle activity detected by at least one muscle activity sensor of the wearable muscle interface device may include transmitting at least one signal from the wearable muscle interface device by the transmitter of the wearable muscle interface device based at least in part on processing the detected muscle activity by the processor of the wearable muscle interface device.

The method may further include detecting motion of the wearable muscle interface device corresponding to the physical gesture performed by the user of the wearable system by at least one accelerometer of the wearable muscle interface device, and transmitting at least one signal from the wearable muscle interface device by a transmitter of the wearable muscle interface device based at least in part on the muscle activity detected by at least one muscle activity sensor of the wearable muscle interface device may include transmitting at least one signal from the wearable muscle interface device by the transmitter of the wearable muscle interface device based on both the muscle activity detected by at least one muscle activity sensor of the wearable muscle interface device and the motion detected by at least one accelerometer of the wearable muscle interface device. Transmitting at least one signal from the wearable muscle interface device by a transmitter of the wearable muscle interface device may include wirelessly transmitting at least one signal from the wearable muscle interface device by a wireless transmitter of the wearable muscle interface device. Receiving the at least one signal directly from the wearable muscle interface device by a receiver of the wearable head-mounted display may include wirelessly receiving the at least one signal directly from the wearable muscle interface device by a wireless receiver of the wearable head-mounted display.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 2A is an isometric view that illustrates a detailed view of a muscle interface device in accordance with the present systems, devices, and methods.

Figure 1:
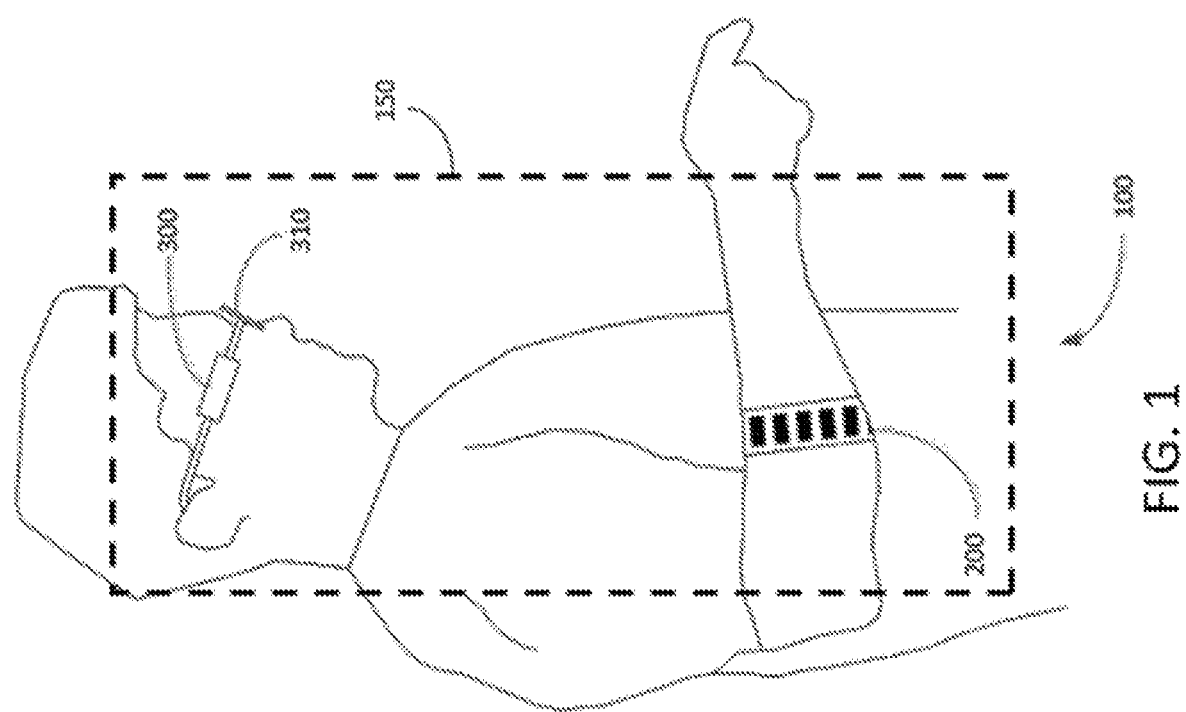
FIG. 1 is a side plan view that illustrates a user wearing a head mounted display and a muscle interface device in accordance with the present systems, devices, and methods.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The present disclosure relates to muscle interface systems, devices and methods that enable a user to access and interact with content displayed on an electronic display in an inconspicuous, hands-free manner.

In an aspect, a wearable system includes a wearable muscle interface device comprising a plurality of muscle activity sensors worn on an arm of a user. The plurality of muscle activity sensors are responsive to signals generated by muscles in the arm of the user. For example, when the user performs a physical gesture that involves one or more muscle(s) in the arm upon which the muscle interface device is worn, at least one of the muscle activity sensors may detect signals generated by the one or more muscle(s). The wearable muscle interface device is adapted to recognize gestures made by the user and to interact with content displayed on a wearable head-mounted display in response to the recognized gestures. To this end, the wearable system further includes a wearable head-mounted display and the wearable muscle interface device includes a transmitter communicatively coupled to the plurality of muscle activity sensors. In use, the transmitter of the wearable muscle interface device transmits at least one signal from the wearable muscle interface device directly to a receiver on the wearable head-mounted display based on the signals detected by the muscle activity sensors. The at least one signal transmitted from the wearable muscle interface device directly to the receiver on the wearable head-mounted display effects at least one interaction with content displayed on the wearable head-mounted display.

In another aspect, a muscle interface method comprises processing at least one signal based on one or more gesture(s) made by a user's hand, wrist and/or arm movements to interact with content displayed on the wearable head-mounted display.

The plurality of muscle activity sensors in and/or on-board the wearable muscle interface device may include electromyography (EMG) sensors and/or mechanomyography (MMG) sensors to detect electrical signals and/or vibrations, respectively, produced by muscles in the user's arm and to provide one or more signal(s) in response to the detected electrical signals and/or vibrations. The electrical signals and/or vibrations detected from the muscles are interpreted as gestures made by the user which provide a direct control input to a wearable head-mounted display.

The control input is provided directly from the wearable muscle interface device to the wearable head-mounted display. Preferably, the control input is provided wirelessly from the wearable muscle interface device directly to the wearable head-mounted display via a wireless communication protocol, such as NFC or Bluetooth™, for example. However, it will be appreciated that other types of wireless communications may be used, including any wireless communication protocol developed for smart phones and similar devices. In some applications, a direct wire connection between the wearable muscle interface device and the wearable head-mounted display may be used.

In addition to EMG and/or MMG sensors, various other types of sensors may be used to detect gestures made by the user. For example, inertial sensors such as accelerometers and/or gyroscopes may be used to detect signals generated by motion of the arm of the user in response to the user performing the physical gesture. The wearable muscle interface device may include one or more accelerometer sensors that, in use, detect signals generated by motion of the arm of the user and/or measure characteristics of gestures made by the user, including gestures involving the elbow or even the shoulders of the user. When used together with EMG and/or MMG sensors for detecting gestures, the accelerometer sensors may be utilized to increase the variety of control inputs that may be generated for direct interaction with a wearable head-mounted display.

An illustrative example will now be described with reference to the drawings.

Shown in FIG. 1 is an illustrative user 100 wearing a wearable system 150 that in use provides hands-free access to and control of a portable electronic display 310 in accordance with the present systems, devices, and methods. Wearable system 150 includes a wearable head-mounted display 310 with on-board display control 300, and a wearable muscle interface device 200 having a plurality of muscle activity sensors in accordance with the present systems, devices, and methods. In this illustrative example, wearable muscle interface device 200 is a flexible, stretchable band that may be worn on the arm (e.g., the forearm) of user 100 as shown. As discussed in more detail herein, wearable muscle interface device 200 includes a transmitter (e.g., a wireless transmitter) and wearable head-mounted display 310 includes a receiver (e.g., a wireless receiver) such that at least one signal may be transmitted from wearable muscle interface device 200 directly to wearable head-mounted display 310 (i.e., without being received and re-transmitted by any intervening device, such as a stationary, non-portable intervening device) in response to signals detected by the muscle activity sensors of wearable muscle interface device 200 in order to effect interactions with and/or control of content displayed on or by wearable head-mounted display 310.

FIG. 2A illustrates a detailed view of wearable muscle interface device 200 from wearable system 150 of FIG. 1 in accordance with the present systems, devices, and methods. As shown, wearable muscle interface device 200 may comprise a processor 210 (e.g., a central processing unit, a digital microcontroller, a digital signal processor, or similar), and one or more batteries 220, which may be rechargeable, and which may be utilized concurrently or sequentially in conventional manner. As shown, wearable muscle interface device 200 is a band to be worn on an arm of a user (e.g., a forearm of a user) and includes a plurality of muscle activity sensors 230 which may be positioned radially around the circumference of the band, such that the sensors 230 can, when in use, detect signals generated by muscles in the arm of user 100 in response to user 100 performing a physical gesture. Wearable muscle interface device 200 may further include transmitter 250 (e.g., a wireless transmitter) communicatively coupled to the plurality of muscle activity sensors 230 which, in use, transmits at least one signal from wearable muscle interface device 200 directly to a receiver on a wearable head-mounted display 310 based on the signals detected by muscle activity sensors 230. Wearable muscle interface device 200 may include a feedback mechanism (e.g., a haptic feedback module) such as a vibratory motor 240 to provide haptic feedback as described further below.

Further exemplary details that may be included in wearable muscle interface device 200 include the systems, articles, and methods described in, without limitation: U.S. Provisional Patent Application Ser. No. 61/768,322, U.S. Provisional Patent Application Ser. No. 61/771,500, U.S. Provisional Patent Application Ser. No. 61/857,105, U.S. Provisional Patent Application Ser. No. 61/860,063, U.S. Provisional Patent Application Ser. No. 61/822,740, U.S. Provisional Patent Application Ser. No. 61/866,960, U.S. Provisional Patent Application Ser. No. 61/869,526, U.S. Provisional Patent Application Ser. No. 61/874,846, U.S. Provisional Patent Application Ser. No. 61/872,569, U.S. Provisional Patent Application Ser. No. 61/881,064, U.S. Provisional Patent Application Ser. No. 61/894,263, U.S. Provisional Patent Application Ser. No. 61/903,238, U.S. Provisional Patent Application Ser. No. 61/909,786, and/or U.S. Provisional Patent Application Ser. No. 61/915,338, all of which are incorporated by reference herein in their entirety.

Wearable muscle interface device 200 may be calibrated when first worn, prior to operation, such that muscle interface device 200 may perform reliable gesture identification regardless of the exact positioning of the muscle activity sensors 230 on the user's arm.

Figure 2B:
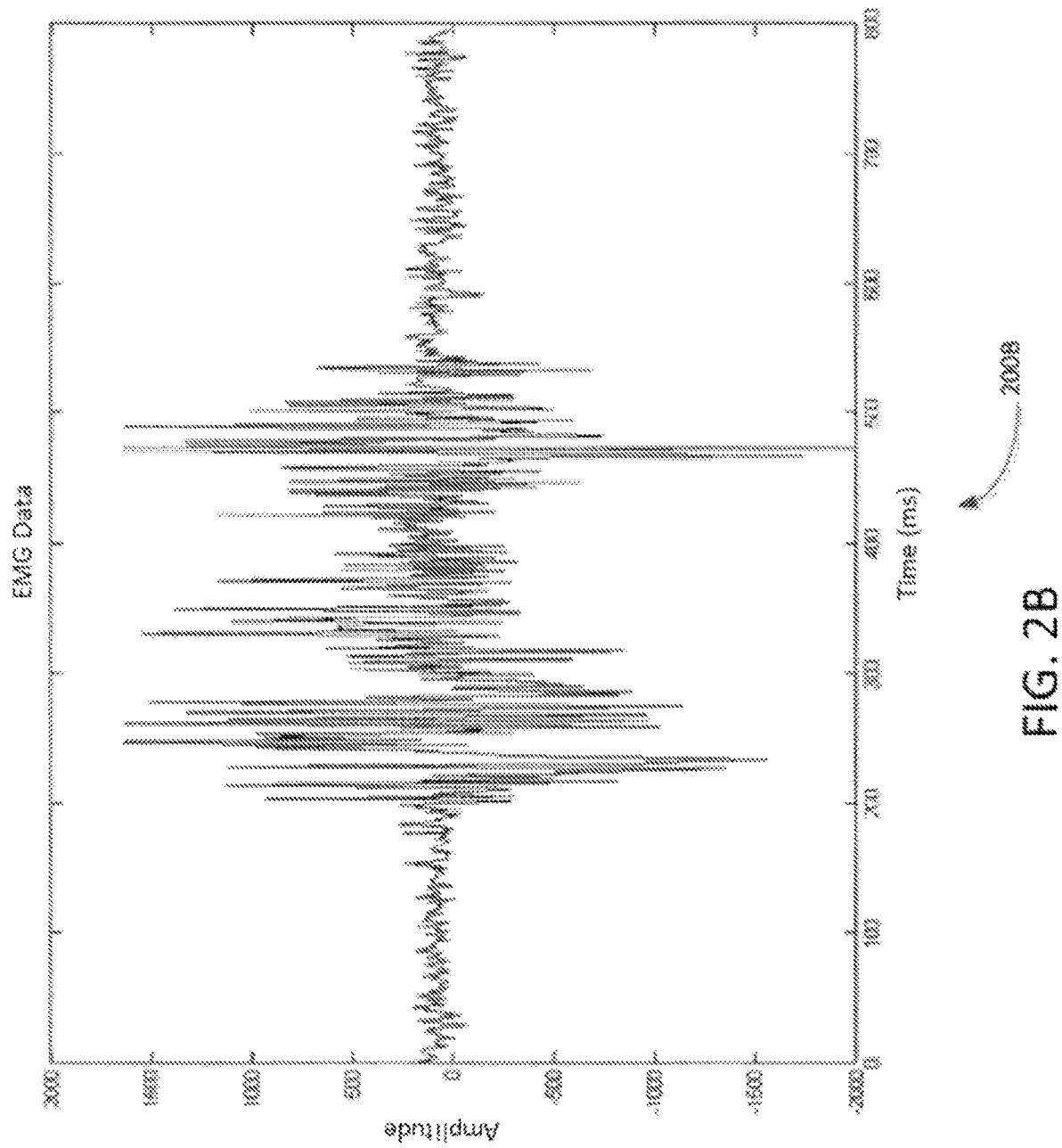
FIG. 2B is a data graph that illustrates an electrical signal detected by an EMG sensor.

By way of example, muscle activity sensors 230 may include one or more EMG sensor(s), each of which may provide a respective EMG signal in the form of an oscillating waveform that varies in both frequency and amplitude. A majority of signal information that is needed for reliable gesture identification may be contained within a limited bandwidth of such an oscillating waveform, such as in the 5 Hz to 250 Hz frequency band. An illustrative example of an EMG signal 200B is shown in FIG. 2B.

As previously described, the plurality of muscle activity sensors 230 may include one or more MMG sensor(s) comprising piezoelectric sensors, which may be used to measure the vibrations at the surface of the skin produced by the underlying muscles when contracted. By way of example, the MMG signal generated may be an oscillating waveform that varies in both frequency and amplitude, and a majority of signal information that is needed for reliable gesture identification may be contained within a limited bandwidth, such as in the 5 Hz to 250 Hz frequency band. Because the MMG signal is acquired via mechanical means, electrical variations like skin impedance may not have a significant effect on the signal. The MMG signal may be very similar to the illustrative example of EMG signal 200B shown in FIG. 2B.

As previously described, wearable muscle interface device 200 may include one or more accelerometer sensor(s) 260 that, in use, detect additional aspects of gestures made by user 100 in, for example, three degrees of freedom. For example, at least one accelerometer 260 may be communicatively coupled to transmitter 250 of wearable muscle interface device 200 and, in use, the at least one signal transmitted from transmitter 250 directly to the receiver on the wearable head-mounted display 310 may be based on both the signals detected by muscle activity sensors 230 and the signals detected by the at least one accelerometer 260. An accelerometer signal may, for example, consist of three digital channels of data, each representing the acceleration in a respective one of three orthogonal directions (e.g., the x, y, and z directions). The signal may be representative of all of the accelerations that the user's arm is subject to, and may further represent motion of the body as a whole.

Figure 3:
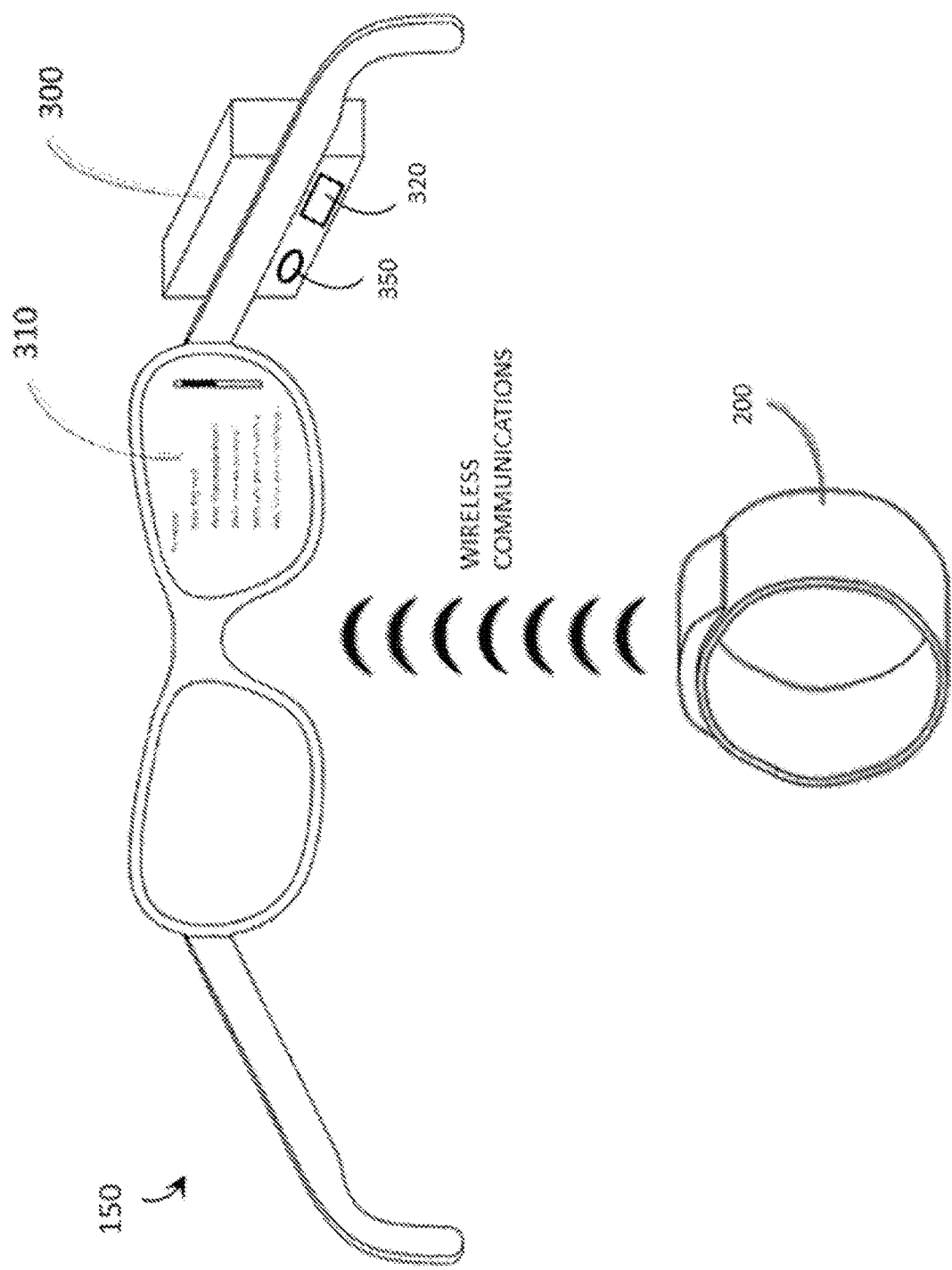
FIG. 3 is a schematic view that illustrates wireless communication between a head mounted display and a muscle interface device in accordance with the present systems, devices, and methods.

Now referring to FIG. 3, shown is wearable system 150 from FIG. 1 with an illustration of direct wireless communication (e.g., Bluetooth™, NFC, etc.) between wearable muscle interface device 200 and wearable head-mounted display 310 in accordance with the present systems, devices, and methods. This wireless communication is utilized to transmit one or more signal(s) from wearable muscle interface device 200 directly to wearable head-mounted display 310 (e.g., to a wireless receiver 350 located in or on display control 300 of wearable head-mounted display 310) without any intervening communicative couplings or links. In this way, the user 100 may access and control or otherwise interact with a portable electronic display in an inconspicuous and hands-free manner. User 100 does not need to use his or her hand(s) to position or orient the portable electronic display of wearable head-mounted display 310 in order to be able to see, access, receive feedback from, or otherwise interact with the portable electronic display of wearable head-mounted display 310 because wearable head-mounted display 310 is arranged such that at least one display screen is positioned in front of at least one eye of user 100 at all times while wearable head-mounted display 310 is worn on user 100's head, regardless of the direction that user 100 is facing. Furthermore, wearable muscle interface device 200 enables user 100 to control or otherwise interact with content displayed on wearable head-mounted display 310 in an inconspicuous manner by using touchless gestures.

Figure 4:
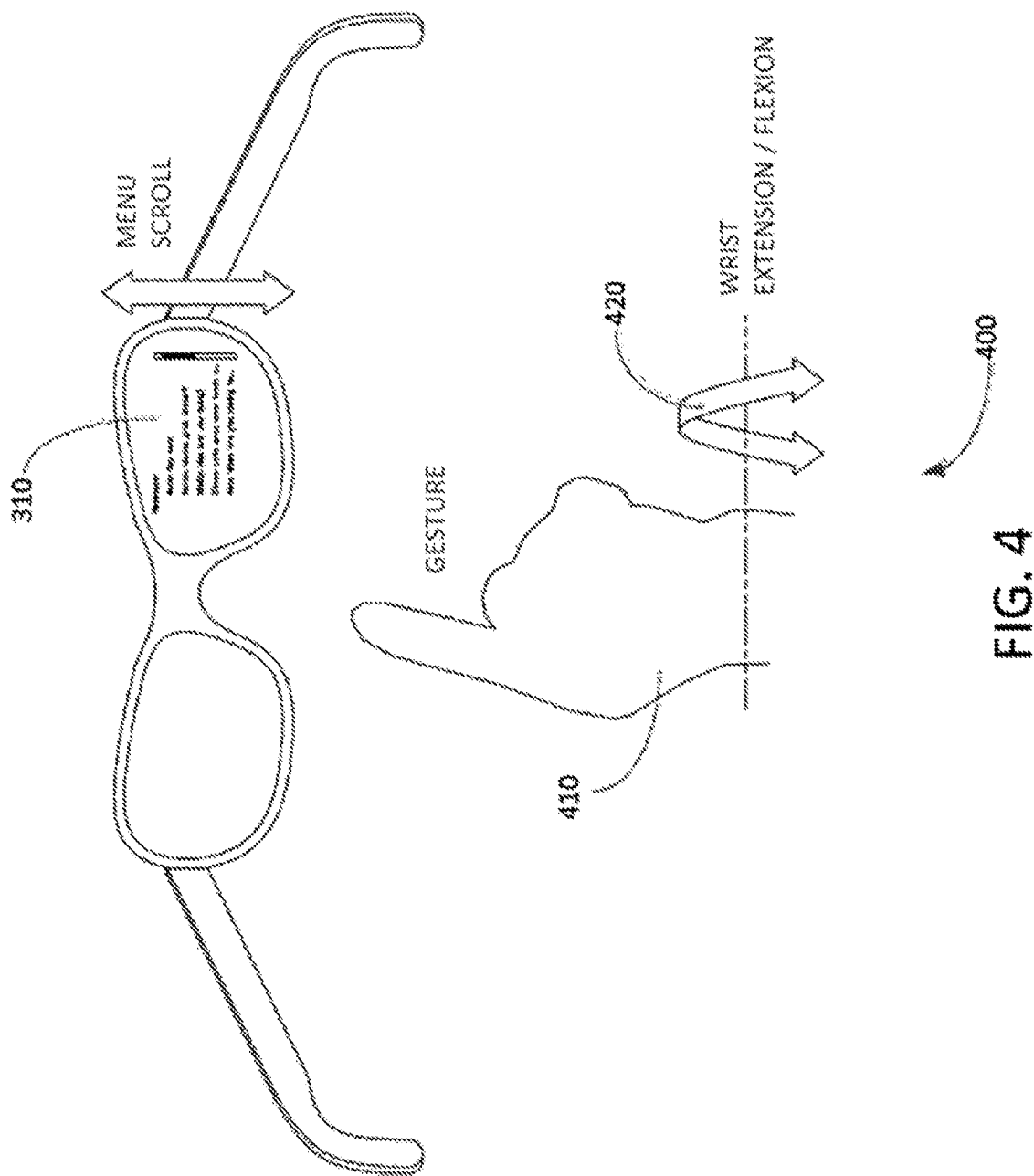
FIG. 4 is a schematic view that illustrates a user's hand and wrist gesture processed as a control signal by the muscle interface device for interacting with content displayed on the head mounted display.

Inconspicuous gesture-based control of and/or interactions with wearable head-mounted display 310 is illustrated by way of example in FIG. 4, in which user 100's hand and wrist gesture is detected and processed by wearable muscle interface device 200 and transmitted directly from transmitter 250 to receiver 350 of wearable head-mounted display 310 for interacting with content displayed thereon.

In this particular example, a gesture 410 made by the user (100) extending an index finger, and making a wrist flexion motion 420 is detected by the muscle activity sensors 230 (and/or accelerometer sensors 260 if included) of wearable muscle interface device 200 (not visible in FIG. 4). Signals provided by the muscle activity sensors 230 in response to the detected gesture 410 are processed by processor 210 (FIG. 2) which interprets the signals to identify gesture 410 performed by user 100. A corresponding signal is produced based on the gesture 410 interpreted by the processor 210 and the signal is transmitted from transmitter 250 directly to receiver 350 of wearable head-mounted display 310, which causes a menu appearing on wearable head-mounted display 310 to scroll downwards.

As another example, a similar gesture in which user 100 extends the index finger and makes a wrist extension motion may be detected by muscle activity sensors 230 (and/or accelerometer sensors 260 if included) of wearable muscle interface device 200 and processed by processor 210 (FIG. 2). Processor 210 may interpret the detected muscle activity to identify the gesture performed, and a corresponding signal may be transmitted from transmitter 250 directly to receiver 350 of wearable head-mounted display 310 to cause a menu appearing on wearable head-mounted display 310 to scroll upwards.

As yet another example, a gesture in which user 100 extends the index finger and makes a poking motion involving a slight movement of the elbow and shoulder may be detected by muscle activity sensors 230 (and/or accelerometer sensors 260 if included) of wearable muscle interface device 200 and processed by processor 210 (FIG. 2). Processor 210 may interpret the detected muscle activity to identify the gesture performed, and a corresponding signal may be transmitted from transmitter 250 directly to receiver 350 of wearable head-mounted display 310 to cause a highlighted menu item appearing on wearable head-mounted display 310 to be selected.

If the user extends a different finger other than the index finger, muscle activity sensors 230 may detect this, a different gesture may be identified by wearable muscle interface device 200, and a different signal may be transmitted directly to wearable head-mounted display 310 to effect a different interaction or function thereof. For example, extending the little finger or "pinky" finger instead of the index finger may cause wearable system 150 to interpret the user's gestures with functions analogous to clicking a right mouse button rather than a left mouse button in a conventional mouse user interface. Extending both the index and pinky fingers at the same time may cause wearable system 150 to interpret the user's gestures with yet other functions analogous to clicking a third mouse button in a conventional mouse user interface.

Thus, wearable muscle interface device 200 may be adapted and/or calibrated to recognize a wide range of gestures made by a user 100, based on measurements from a plurality of muscle activity sensors 230 (and, in some implementations, one or more accelerometer sensor(s) 260) in the wearable muscle interface device 200.

Wearable muscle interface device 200 may itself be operative to interpret the gestures from the detected signals as described above by, for example, using an on-board processor 210 to process the EMG signals and interpret the EMG signals as a gesture via a gesture identification process (e.g., by invoking data and/or instructions stored in an on-board non-transitory computer-readable storage medium that, when executed by processor 210, cause processor 210 to identify the gesture performed by user 100). Wearable muscle interface device 200 may then transmit one or more signal(s) from transmitter 250 directly to receiver 350 of wearable head-mounted display 310 in order to effect some interaction with wearable head-mounted display 310 based on the interpreted gesture. In this example, the processor 210 may be communicatively coupled in between the transmitter 250 and the plurality of muscle activity sensors 230 such that transmitter 250 transmits one or more signal(s) provided by processor 210 (e.g., corresponding to an interpreted gesture) based at least in part on the signals provided by muscle activity sensors 230.

However, in an alternative implementation, the detected EMG signals may be transmitted directly to the receiver 350 of wearable head-mounted display 310 from transmitter 250 (e.g., without being processed by processor 210, which may or may not be included in device 200 in this example) and wearable head-mounted display 310 may include a processor 320 (e.g., a central processing unit, a digital microcontroller, a digital signal processor, or similar, located in or on display control 300) communicatively coupled to receiver 350 to process the EMG signals and interpret the EMG signals as a gesture via a gesture identification process (e.g., by invoking data and/or instructions stored in an on-board non-transitory computer-readable storage medium that, when executed by processor 320, cause processor 320 to identify the gesture performed by user 100). Wearable head-mounted display 310 may then effect some interaction with content displayed thereon based on the interpreted gesture. Whether the detected EMG signals are interpreted at the device 200 or at the display 310, the detected EMG signals are first interpreted as a recognized gesture in order to interact with content displayed on the display 310.

Wearable muscle interface device 200 may include a haptic feedback module to provide feedback that a gesture has been recognized. This haptic feedback may provide a user 100 with confirmation that the user 100's gesture has been recognized, and successfully converted to a signal to interact with content displayed on wearable head-mounted display 310. The haptic feedback module may comprise, for example, a vibrating mechanism such as a vibratory motor 240 built into the wearable muscle interface device 200.

Alternatively, rather than haptic feedback provided by the wearable muscle interface device 200, confirmation of recognition of a gesture may be provided by auditory feedback, either generated by a speaker on the wearable muscle interface device 200, or operatively connected to the wearable head-mounted display 310.

As another alternative, confirmation of recognition of a gesture may be provided visually on the wearable head-mounted display 310 itself. If there is more than one possible gesture that may be interpreted from the detected signals, rather than providing a possibly erroneous signal, the wearable muscle interface device 200 and/or the wearable head-mounted display 310 may provide a selection of two or more possible gestures as possible interpretations, and the user may be prompted to select from one of them to confirm the intended gesture and corresponding control.

Figure 5:
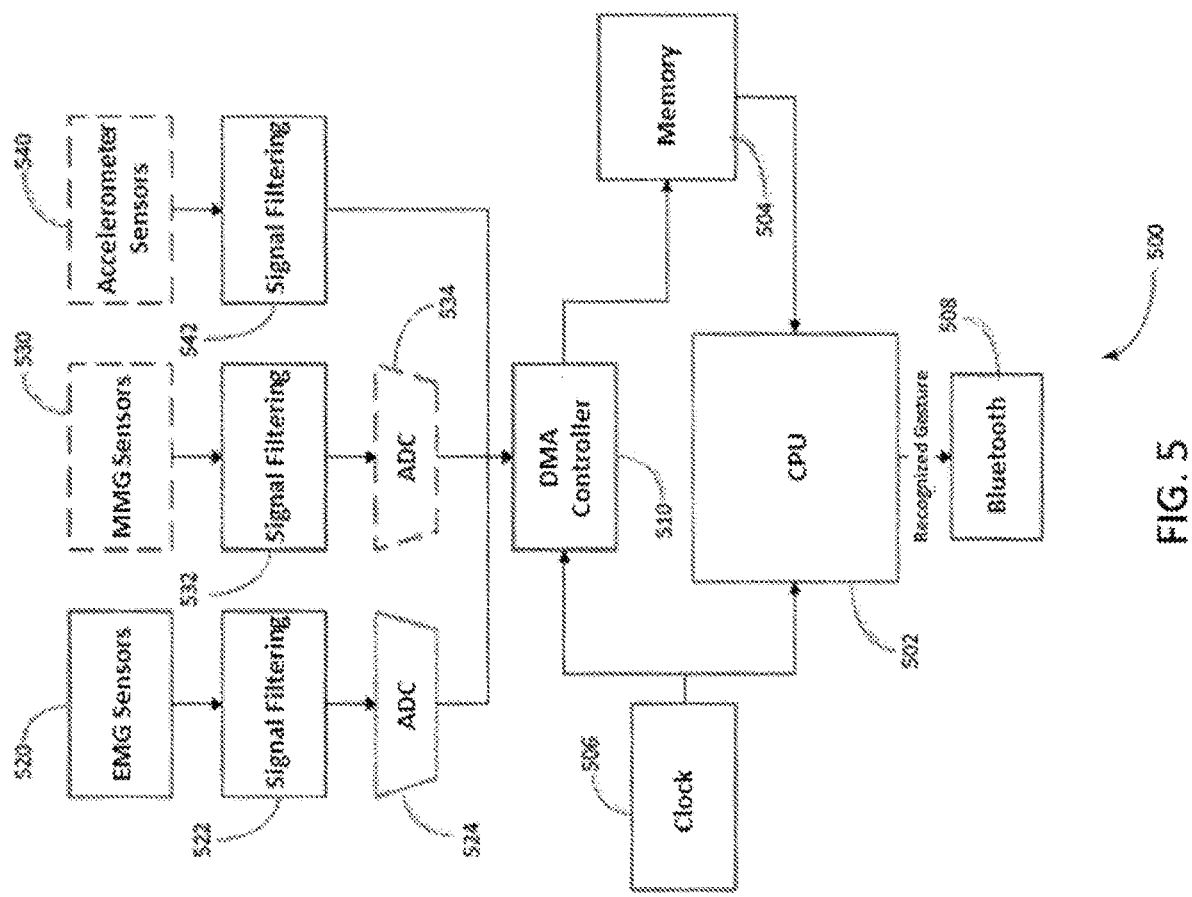
FIG. 5 is a schematic view of a system architecture of a muscle interface device in accordance with the present systems, devices, and methods.

Now referring to FIG. 5, shown is an illustrative schematic system architecture 500 of the wearable muscle interface device 200 component of a wearable system 150 providing inconspicuous and hands-free access to and control of a portable electronic display in accordance with the present systems, device, and methods. As shown, system architecture 500 includes a CPU 502 (e.g., a processor, such as a digital microprocessor or microcontroller), non-transitory computer-readable memory 504, system clock 506, a wireless communication module 508 (e.g., Bluetooth™, NFC, or the like), and a direct memory access (DMA) controller 510. As shown, DMA controller 510 is adapted to receive inputs from various sensors on-board the wearable muscle interface device 200, including one or more EMG sensors 520, MMG sensors 530 and/or accelerometer sensors 540.

In the illustrative example of system architecture 500, detected signals from one or more EMG sensors 520 are processed through signal filter 522 and converted from analog to digital signals by ADC 524. If one or more MMG sensors 530 are used (either in addition to or instead of EMG sensors 520), then the detected signals from the MMG sensors 530 are processed through signal filter 532 and converted from analog to digital signals by ADC 534. Digital signals from one or more accelerometer sensors 540 may also be processed through signal filter 542 and received by DMA controller 510.

The data from the various types of sensors 520, 530, 540 may be acquired through an analog filtering chain. The data may be band-passed through filters 522, 532 between about 10 Hz to about 500 Hz, and amplified (e.g. by a total of about 1000 times). This filtering and amplification can be altered to whatever is required to be within software parameters. A notch filter at 60 Hz, or at any other relevant frequency, may also be used to remove powerline noise.

Data from the sensors 520, 530 may be converted to, e.g., 12-bit digital data by ADCs 524, 534, and then clocked into onboard memory 504 using clock 506 by the DMA controller 510 to be processed by the CPU 502.

Figure 6:
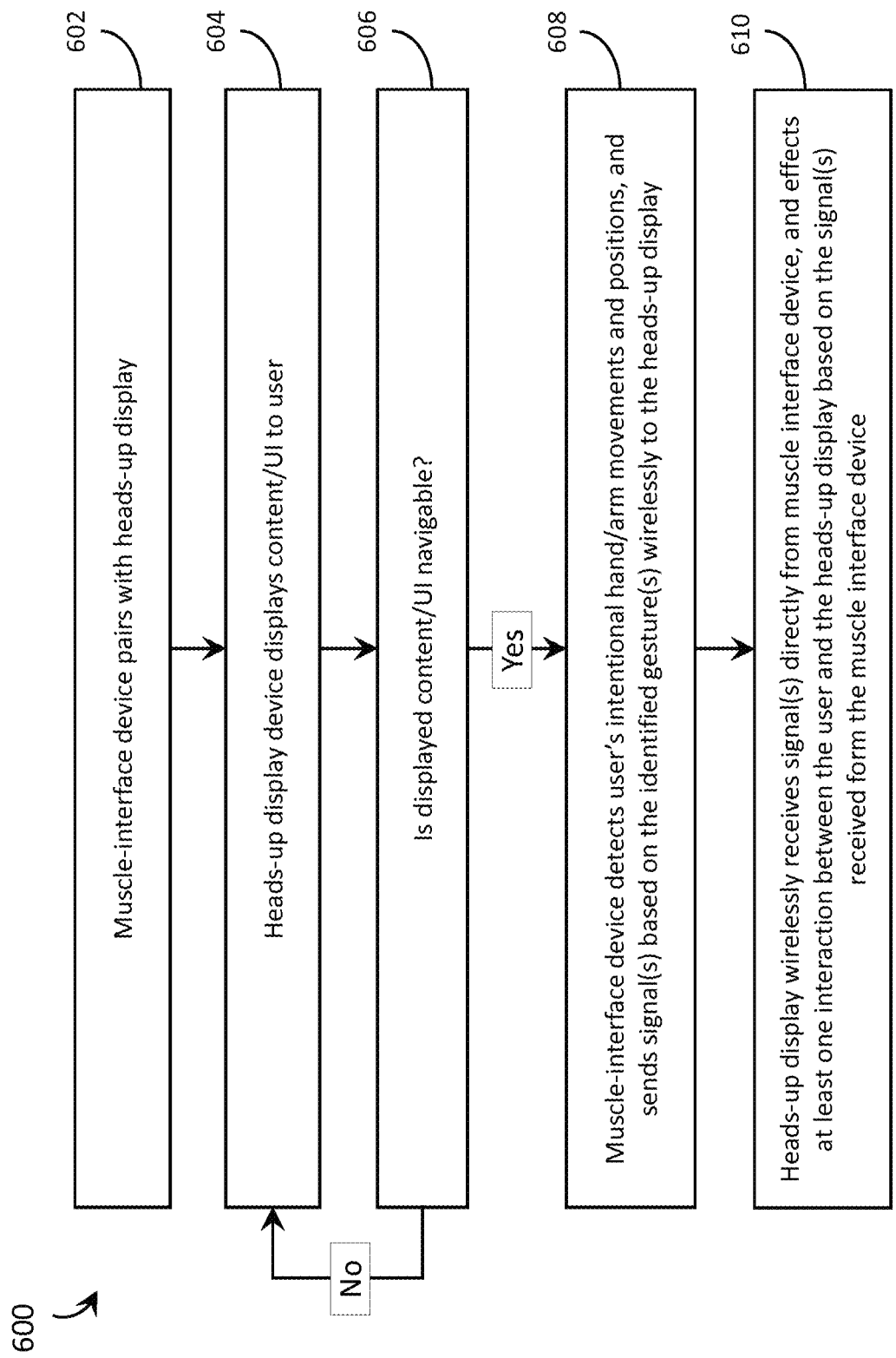
FIG. 6 is a flow chart of a method of using a wearable system to achieve hands-free access to and control of a portable electronic display in accordance with the present systems, devices, and methods.

Now referring to FIG. 6, shown is a schematic flow chart of a method 600 of using a wearable system (e.g., 150) to achieve hands-free access to and control of a portable electronic display in accordance with the present systems, devices, and methods. As shown, method 600 begins at block 602, where method 600 pairs a wearable muscle interface device 200 with a wearable head-mounted display 310. Method 600 then proceeds to block 604, where content and/or user interface (UI) is displayed on the wearable head-mounted display 310.

Method 600 then proceeds to block 606, where method 600 determines if the displayed content and/or UI is navigable. If no, method 600 returns to block 604. If yes, method 600 proceeds to block 608, where the wearable muscle interface device 200 detects muscle activity corresponding to a physical gesture performed by a user of the wearable system 150 (i.e., at least one muscle activity sensor 230 of the wearable muscle interface device 200 detects the user's intentional hand/arm movements and positions), and wirelessly sends/transmits at least one signal corresponding to an identified gesture from the wearable muscle interface device 200 to the wearable head-mounted display 310. The at least one signal may be sent by a transmitter 250 of the wearable muscle interface device 200 based on the muscle activity detected by at least one muscle activity sensor 230 of the wearable muscle interface device 200.

Method 600 then proceeds to block 610, where a receiver 350 on the wearable head-mounted display 310 receives the at least one signal directly from the transmitter 250 of the wearable muscle interface device 200. A processor 320 of the wearable head-mounted display 310 processes the at least one signal, and effects at least one interaction between the user 100 and the wearable head-mounted display 310 based on the processing of the at least one signal by processor 320 of the wearable head-mounted display 310.

Figure 7:
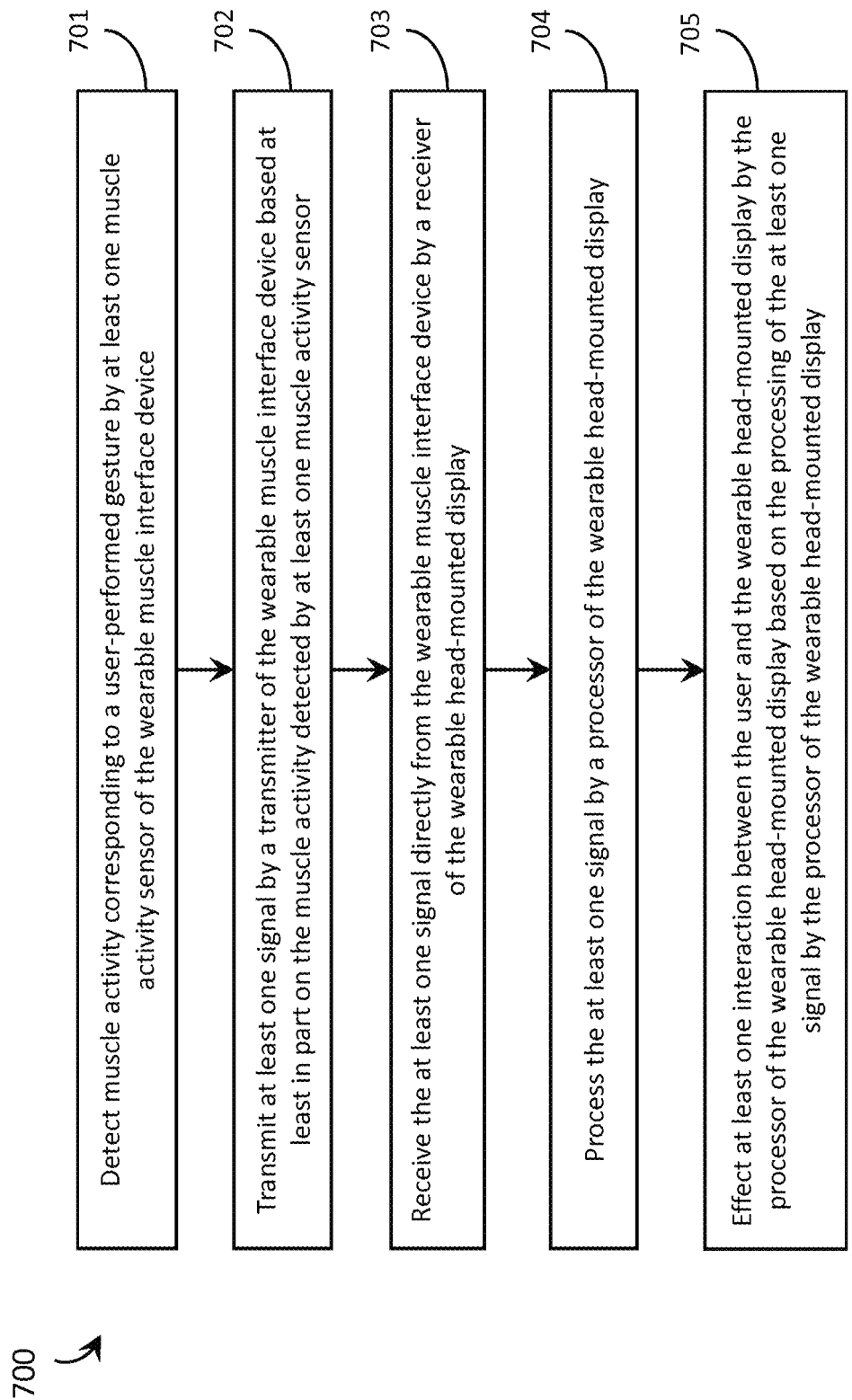
FIG. 7 is a flow-diagram showing a method of using wearable system to achieve hands-free access to and control of a portable electronic display in accordance with the present systems, devices, and methods.

Another example of a method employing a wearable system in accordance with the present systems, devices, and methods is illustrated in FIG. 7. FIG. 7 is a flow-diagram showing a method 700 of using wearable system 150 to achieve hands-free access to and control of a portable electronic display. The wearable system 150 includes a wearable muscle interface device 200 and a wearable head-mounted display 310. Method 700 includes five acts 701, 702, 703, 704, and 705, although those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 700, the term "user" refers to a person that is wearing both the wearable muscle interface device 200 (e.g., worn on at least one of the user's arms) and the wearable head-mounted display 310 of the wearable system 150 (e.g., worn on the user's head).

At 701, the user performs a physical gesture and muscle activity corresponding to the physical gesture is detected by at least muscle activity sensor 230 of the wearable interface device 200. The muscle activity sensors 230 may include at least one EMG sensor that detects electrical signals generated by the muscle activity and/or at least one MMG sensor that detects vibrations generated by the muscle activity. In addition to muscle activity, motion of the wearable muscle interface device 200 corresponding to the physical gesture may be detected by at least one accelerometer 260 on-board the wearable muscle interface device 200.

At 702, at least one signal is transmitted by a transmitter 250 of the wearable muscle interface device 200 based at least in part on the muscle activity detected at 701. As previously described, transmitter 250 may be a wireless transmitter such that transmitting at least one signal by transmitter 250 includes wirelessly transmitting the at least one signal by transmitter 250. In implementations in which motion of the wearable muscle interface device 200 is also detected by at least one accelerometer 260, transmitting at least one signal by transmitter 250 based at least in part on the muscle activity detected at 701 may include transmitting at least one signal by transmitter 250 based on both the muscle activity detected by at least one muscle activity sensor 230 and the motion detected by at least one accelerometer 260.

In response to detecting muscle activity corresponding to a physical gesture performed by the user at 701, method 700 may include processing the detected muscle activity by a processor 210 communicatively coupled in between the muscle activity sensors 230 and the transmitter 250 (e.g., to interpret the signals provided by the muscle activity sensors 230 and/or to identify the user-performed gesture). In this case, transmitting at least one signal by transmitter 250 based at least in part on the muscle activity detected at 701 may include transmitting at least one signal by transmitter 250 based at least in part on processing the detected muscle activity by the processor 210 of the wearable muscle interface device 200.

At 703, the at least one signal is received directly from transmitter 250 by a receiver 350 of the wearable head-mounted display 310. In implementations where transmitter 250 is a wireless transmitter, receiver 350 may include a wireless receiver such that receiving the at least one signal by receiver 350 includes wirelessly receiving the at least one signal by receiver 350. The at least one signal is transmitted directly from transmitter 250 to receiver 350 without routing through any intervening devices or systems.

At 704, the at least one signal received by receiver 350 is processed by a processor 320 of the wearable head-mounted display 320. Processing the at least one signal by the processor 320 of the wearable head-mounted display may include, for example, mapping or otherwise associating the at least one signal to/with one or more function(s) of the wearable head-mounted display 310 based on data and/or instructions stored in a non-transitory computer-readable storage medium on-board the wearable head-mounted display 310 (data and/or instructions which, when executed by the processor 320 of the wearable head-mounted display 310, cause the processor 320 of the wearable head-mounted display to effect one or more function(s) of the wearable head-mounted display 310).

At 705, at least one interaction between the user and the wearable head-mounted display 310 is effected by the processor 320 of the wearable head-mounted display 310 based on the processing of the at least one signal at 704. The at least one interaction may include any function or operation that prompts, modifies, changes, elicits, or otherwise involves visual information provided to the user by the wearable head-mounted display 310, including without limitation: interacting with visual material such as a photograph or video, navigating a menu, interacting with visually displayed elements such as a map or an element of a video game, and so on. Depending on the specific application, elements displayed on the wearable head-mounted display 310 may or may not accommodate or otherwise take into account aspects of the user's environment that may be visible to the user. For example, elements displayed on the wearable head-mounted display 310 may obscure, overlay, augment, highlight, block, be superimposed on, and/or semi-transparently project in front of elements of the user's environment.

As will be appreciated, the systems, devices, and methods that enable a user to access and interact with content displayed on an electronic display in an inconspicuous, hands-free manner described herein may be used for interaction with a portable electronic display in a wide range of applications, in virtually any application in which portable electronic displays are contemplated. By providing a discreet method of interacting with a wearable head-mounted display, a user is able to interact with such a display in any operating environment, including situations where overt gesturing (e.g. raising the hand to touch an input device provided on the wearable head-mounted display itself) is not desirable.

While various embodiments and illustrative examples have been described above, it will be appreciated that these embodiments and illustrative examples are not limiting, and the scope of the invention is defined by the following claims.

The various embodiments described herein provide, at least, a wearable system (e.g., 150) including a wearable muscle interface device (e.g., 200) that, in use, is to be worn on an arm of a user in order to enable hands-free access to, and control of, a wearable head-mounted display (e.g., 310). As described previously, the singular forms "a," "an," and "the" used in this specification and the appended claims include plural referents unless the content clearly dictates otherwise. In some applications, it can be advantageous or otherwise desirable for such a wearable system (150) to employ two or more wearable muscle interface devices (e.g., two or more wearable muscle interface devices 200) worn on both of the user's arms (e.g., at least a respective wearable muscle interface device 200 worn on each of the user's arms) as described in U.S. Provisional Patent Application Ser. No. 61/874,846. Such may enable a greater number and/or diversity of gestures to be used to interact with content displayed on the wearable head-mounted display (e.g., 310). Furthermore, in various embodiments the gesture-based interaction systems, devices, and methods described herein may be combined with other forms of touchless control, including without limitation: voice/speech-based control techniques such as Siri®, control techniques based on eye/vision tracking and/or blinking, electroencephalography (EEG), or the like.

Throughout this specification and the appended claims, the terms "head-mounted display" and "heads-up display" are used substantially interchangeably to refer to an electronic display that is worn on the head of a user and arranged so that at least one electronic display is positioned in front of at least one eye of the user when the head-mounted/heads-up display is worn on the head of the user. For greater clarity, "positioned in front of at least one eye of the user" means that the content displayed on or by the electronic display is displayed, projected, or otherwise provided generally in front of at least one eye of the user and is visible by that at least one eye regardless of the orientation or position of the user's head. An electronic display that is "positioned in front of at least one eye of the user" may correspond to a projection, reflection, refraction, diffraction, or direct display of optical signals and may be located in the user's direct line of sight or may be located off of the user's direct line of sight such that the user may or may not need to deliberately direct one or more eye(s), without necessarily moving their head, towards the electronic display in order to see (i.e., access) the content displayed thereby.

Throughout this specification and the appended claims, the term "gesture" is used to generally refer to a physical action (e.g., a movement, a stretch, a flex, a pose) performed or otherwise effected by a user. Any physical action performed or otherwise effected by a user that involves detectable muscle activity (detectable, e.g., by at least one appropriately positioned muscle activity sensor) and/or detectable motion (detectable, e.g., by at least one appropriately positioned inertial sensor, such as an accelerometer and/or a gyroscope) may constitute a gesture in the present systems, articles, and methods.

Throughout this specification and the appended claims the term "communicative" as in "communicative pathway," "communicative coupling," and in variants such as "communicatively coupled," is generally used to refer to any arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, the term "provide" and variants such as "provided" and "providing" are frequently used in the context of signals. For example, a muscle activity sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a surface EMG sensor may include at least one electrode that resistively or capacitively couples to electrical signals from muscle activity. This coupling induces a change in a charge or electrical potential of the at least one electrode which is then relayed through the sensor circuitry and output, or "provided," by the sensor. Thus, the surface EMG sensor may "provide" an electrical signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

Throughout this specification and the appended claims, "identifying" or "interpreting signals as" a gesture means associating a set of signals provided by one or more muscle activity sensor(s) (230) with a particular gesture. In the various embodiments described herein, "identifying" or "interpreting signals as" a gesture includes determining which gesture in a gesture library is most probable (relative to the other gestures in the gesture library) of being the gesture that a user has performed or is performing in order to produce the signals upon which the gesture identification is at least partially based. The wearable muscle interface devices described herein are generally not operative to identify any arbitrary gesture performed by a user. Rather, the wearable muscle interface devices described herein are operative to identify when a user performs one of a specified set of gestures, and that specified set of gestures is referred to herein as a gesture library. A gesture library may include any number of gestures, though a person of skill in the art will appreciate that the precision/accuracy of gesture identification may be inversely related to the number of gestures in the gesture library. A gesture library may be expanded by adding one or more gesture(s) or reduced by removing one or more gesture(s). Furthermore, in accordance with the present systems, articles, and methods, a gesture library may include a "rest" gesture corresponding to a state for which no activity is detected and/or an "unknown" gesture corresponding to a state for which activity is detected but the activity does not correspond to any other gesture in the gesture library.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/752,226, filed Jan. 14, 2013, U.S. Provisional Patent Application Ser. No. 61/768,322, U.S. Provisional Patent Application Ser. No. 61/771,500, U.S. Provisional Patent Application Ser. No. 61/857,105, U.S. Provisional Patent Application Ser. No. 61/860,063, U.S. Provisional Patent Application Ser. No. 61/822,740, U.S. Provisional Patent Application Ser. No. 61/866,960, U.S. Provisional Patent Application Ser. No. 61/869,526, U.S. Provisional Patent Application Ser. No. 61/874,846, U.S. Provisional Patent Application Ser. No. 61/872,569, US Provisional Patent Application Serial No. 61/881,064, U.S. Provisional Patent Application Ser. No. 61/894,263, U.S. Provisional Patent Application Ser. No. 61/903,238, U.S. Provisional Patent Application Ser. No. 61/909,786, and/or U.S. Provisional Patent Application Ser. No. 61/915,338, are incorporated herein by reference, in their entirety. Aspects of 5 the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable muscle interface device that in use interacts with content displayed on a wearable head-mounted display, the wearable muscle interface device comprising:
a plurality of muscle activity sensors to be worn on an arm of a user, the muscle activity sensors responsive to electrical signals generated by muscles in the arm of the user;
at least one accelerometer;
a processor configured to:
generate, based on at least the electrical signals detected by the muscle activity sensors and motion of the arm of the user detected by the at least one accelerometer,
a first interpretation of a gesture performed by the user, and
a second interpretation of the gesture performed by the user, and
generate at least one control signal to request input from the user to select one of the first interpretation of the gesture or the second interpretation of the gesture, wherein the first interpretation of the gesture and the second interpretation of the gesture represent different gestures selected by the processor from a set of at least three defined gestures;
a transmitter communicatively coupled to the plurality of muscle activity sensors, wherein in use the transmitter transmits at least one signal from the wearable muscle interface device directly to a receiver on the wearable head-mounted display based on the signals detected by the muscle activity sensors;
wherein the at least one signal transmitted, in use, from the wearable muscle interface device directly to the receiver on the wearable head-mounted display effects at least one interaction with content displayed on the wearable head-mounted display including requesting the input from the user to select one of the first interpretation of the gesture performed by the user or the second interpretation of the gesture performed by the user.

2. The wearable muscle interface device of claim 1, wherein the processor interprets the signals detected by the muscle activity sensors as gesture, wherein the processor is communicatively coupled in between the transmitter and the plurality of muscle activity sensors, and wherein the at least one signal that, in use, is transmitted from the wearable muscle interface device is based on the gesture interpreted by the processor of the wearable muscle interface device.

3. The wearable muscle interface device of claim 1, wherein the wearable head-mounted display includes a processor communicatively coupled to the receiver of the wearable head-mounted display, and wherein the at least one signal that, in use, is transmitted from the wearable muscle interface device to the wearable head-mounted display is interpreted as a gesture by the processor of the wearable head-mounted display.

4. The wearable muscle interface device of claim 1, further comprising a haptic feedback module that in use provides haptic feedback to the user, the haptic feedback module including a vibratory motor.

5. The wearable muscle interface device of claim 1, wherein the plurality of muscle activity sensors includes at least one muscle activity sensor selected from the group consisting of: an electromyographic (EMG) sensor and a mechanomyographic (MMG) sensor.

6. The wearable muscle interface device of claim 1,
wherein the at least one accelerometer detects signals generated by motion of the arm of the user, the at least one accelerometer communicatively coupled to the transmitter, and wherein in use the at least one signal transmitted from the transmitter of the wearable muscle interface device directly to the receiver on the wearable head-mounted display is based on both the signals detected by the muscle activity sensors and the signals detected by the at least one accelerometer.

7. The wearable muscle interface device of claim 1, wherein the transmitter includes a wireless transmitter.

8. A wearable system that in use provides hands-free access to and control of a portable electronic display, the wearable system comprising:
i) a wearable muscle interface device comprising:
a plurality of muscle activity sensors to be worn on an arm of a user, the muscle activity sensors responsive to electrical signals generated by muscles in the arm of the user;
at least one accelerometer;
a processor configured to:
generate, based on at least the electrical signals detected by the muscle activity sensors and motion of the arm of the user detected by the at least one accelerometer,
a first interpretation of a gesture performed by the user, and
a second interpretation of the gesture performed by the user, and
generate at least one control signal to request input from the user to select one of the first interpretation of the gesture or the second interpretation of the gesture, wherein the first interpretation of the gesture and the second interpretation of the gesture represent different gestures selected by the processor from a set of at least three defined gestures;

a transmitter communicatively coupled to the plurality of muscle activity sensors, wherein in use the transmitter transmits at least one signal from the wearable muscle interface device based on the signals detected by the muscle activity sensors; and ii) a wearable head-mounted display comprising:

at least one display screen to be worn on a head of the user, the at least one display screen arranged to be positioned in front of at least one eye of the user when worn on the head of the user;

a receiver communicatively coupled to the at least one display screen, wherein in use the receiver directly receives the at least one signal transmitted from the transmitter of the wearable muscle interface device; and a processor communicatively coupled to the receiver and to the at least one display screen, wherein in use the at least one signal received directly from the transmitter of the wearable muscle interface device by the receiver of the wearable head-mounted display effects control of at least one function of the wearable head-mounted display including requesting the input from the user to select one of the first interpretation of the gesture performed by the user or the second interpretation of the gesture performed by the user.

9. The wearable system of claim 8, wherein the transmitter of the wearable muscle interface device includes a wireless transmitter and the receiver of the wearable head-mounted display includes a wireless receiver.

10. The wearable system of claim 8, wherein the processor interprets the signals detected by the muscle activity sensors as a gesture, wherein the processor of the wearable muscle interface device is communicatively coupled in between the transmitter and the plurality of muscle activity sensors, and wherein the at least one signal that, in use, is transmitted from the wearable muscle interface device is based on the gesture interpreted by the processor of the wearable muscle interface device.

11. The wearable system of claim 8, wherein the plurality of muscle activity sensors includes at least one muscle activity sensor selected from the group consisting of: an electromyographic (EMG) sensor and a mechanomyographic (MMG) sensor.

12. The wearable system of claim 8, wherein the accelerometer detects signals generated by motion of the arm of the user, the at least one accelerometer communicatively coupled to the transmitter, and wherein in use the at least one signal transmitted by the transmitter of the wearable muscle interface device is based on both the signals detected by the muscle activity sensors and the signals detected by the at least one accelerometer.

13. A method of using a wearable system to achieve hands-free access to and control of a portable electronic display, wherein the wearable system includes a wearable muscle interface device, at least one accelerometer, a processor, and a wearable head-mounted display, the method comprising:

detecting muscle activity corresponding to a physical gesture performed by a user of the wearable system by at least one muscle activity sensor of the wearable muscle interface device;

generating, based on at least the electrical signals detected by the at least one muscle activity sensor and motion of the arm of the user detected by the at least one accelerometer, a first interpretation of a gesture performed by the user, and a second interpretation of the gesture performed by the user, and generating at least one control signal to request input from the user to select one of the first interpretation of the gesture or the second interpretation of the gesture, wherein the first interpretation of the gesture and the second interpretation of the gesture represent different gestures selected by the processor from a set of at least three defined gestures;

transmitting at least one signal from the wearable muscle interface device by a transmitter of the wearable muscle interface device based at least in part on the muscle activity detected by at least one muscle activity sensor of the wearable muscle interface device;

receiving the at least one signal directly from the wearable muscle interface device by a receiver of the wearable head-mounted display;

processing the at least one signal by a processor of the wearable head-mounted display and;

effecting at least one interaction between the user and the wearable head-mounted display by the processor of the wearable head-mounted display based on the processing of the at least one signal by the processor of the wearable head-mounted display including requesting the input from the user to select one of the first interpretation of the gesture performed by the user or the second interpretation of the gesture performed by the user.

14. The method of claim 13, further comprising:

in response to detecting muscle activity corresponding to a physical gesture performed by a user of the wearable system by at least one muscle activity sensor of the wearable muscle interface device, processing the detected muscle activity by the processor of the wearable muscle interface device, and wherein transmitting at least one signal from the wearable muscle interface device by a transmitter of the wearable muscle interface device based at least in part on the muscle activity detected by at least one muscle activity sensor of the wearable muscle interface device includes transmitting at least one signal from the wearable muscle interface device by the transmitter of the wearable muscle interface device based at least in part on processing the detected muscle activity by the processor of the wearable muscle interface device.

15. The method of claim 13, further comprising:

detecting motion of the wearable muscle interface device corresponding to the physical gesture performed by the user of the wearable system by the at least one accelerometer of the wearable muscle interface device, and wherein transmitting at least one signal from the wearable muscle interface device by a transmitter of the wearable muscle interface device based at least in part on the muscle activity detected by at least one muscle activity sensor of the wearable muscle interface device includes transmitting at least one signal from the wearable muscle interface device by the transmitter of the wearable muscle interface device based on both the muscle activity detected by at least one muscle activity sensor of the wearable muscle interface device and the motion detected by at least one accelerometer of the wearable muscle interface device.

16. The method of claim 13, wherein:

transmitting at least one signal from the wearable muscle interface device by a transmitter of the wearable muscle interface device includes wirelessly transmitting at least one signal from the wearable muscle interface device by a wireless transmitter of the wearable muscle interface device; and receiving the at least one signal directly from the wearable muscle interface device by a receiver of the wearable head-mounted display includes wirelessly receiving the at least one signal directly from the wearable muscle interface device by a wireless receiver of the wearable head-mounted display.

17. The method of claim 13, wherein a haptic feedback module provides haptic feedback to the user.

18. The method of claim 17, wherein the haptic feedback module includes a vibratory motor.

19. The method of claim 13, wherein the at least one muscle activity sensor comprises a muscle activity sensor selected from the group consisting of: an electromyographic (EMG) sensor and a mechanomyographic (MMG) sensor.

20. The method of claim 13, wherein the transmitter of the wearable muscle interface device includes a wireless transmitter and the receiver of the wearable head-mounted display includes a wireless receiver.

* * * * *